(12) United States Patent
Lim et al.

(10) Patent No.: US 9,594,501 B2
(45) Date of Patent: Mar. 14, 2017

(54) METHOD FOR CHANGING DISPLAY RANGE AND ELECTRONIC DEVICE THEREOF

(71) Applicant: Samsung Electronics Co., Ltd., Gyeonggi-do (KR)

(72) Inventors: Yong-Jin Lim, Gyeongsangbuk-do (KR); Byung-Hwan Kim, Busan (KR); Youn-Soo Kim, Gyeongsangbuk-do (KR); Hyung-Jin Kim, Daegu (KR); Jeong-Hwan Noh, Gyeongsangbuk-do (KR); In-Su Park, Gyeongsangbuk-do (KR); Jung-Il Cho, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 13/972,694

(22) Filed: Aug. 21, 2013

(65) Prior Publication Data
US 2014/0055390 A1    Feb. 27, 2014

(30) Foreign Application Priority Data
Aug. 21, 2012 (KR) .......................... 10-2012-0091181

(51) Int. Cl.
G06F 3/048 (2013.01)
G06F 3/0488 (2013.01)

(52) U.S. Cl.
CPC ........ *G06F 3/0488* (2013.01); *G06F 3/04886* (2013.01); *G06F 2203/04803* (2013.01); *G06F 2203/04806* (2013.01)

(58) Field of Classification Search
CPC . G06F 3/048–3/04812; G06F 3/0484–3/0487; G06F 3/0488; G06F 3/04886; G06F 2203/04806; G06F 2203/04803
See application file for complete search history.

(56) References Cited

U.S. PATENT DOCUMENTS

| | | | | |
|---|---|---|---|---|
| 5,543,591 | A * | 8/1996 | Gillespie et al. | 178/18.03 |
| 2010/0023858 | A1* | 1/2010 | Ryu | G06F 3/0416 715/702 |
| 2010/0081475 | A1* | 4/2010 | Chiang | G06F 3/0483 455/564 |
| 2012/0052921 | A1 | 3/2012 | Lim et al. | |
| 2013/0024805 | A1* | 1/2013 | In et al. | 715/781 |
| 2013/0120447 | A1* | 5/2013 | Kim | G06T 11/60 345/629 |

* cited by examiner

*Primary Examiner* — Liliana Cerullo

(57) ABSTRACT

Provided are methods for changing a display range in an electronic device having a touchscreen. The method for changing a display range in an electronic device includes: detecting a plurality of touches; determining a plurality of regions in consideration of a plurality of touch points; and changing a display range of at least one region of the plurality of regions in consideration of change in a distance between the plurality of touch points.

14 Claims, 32 Drawing Sheets

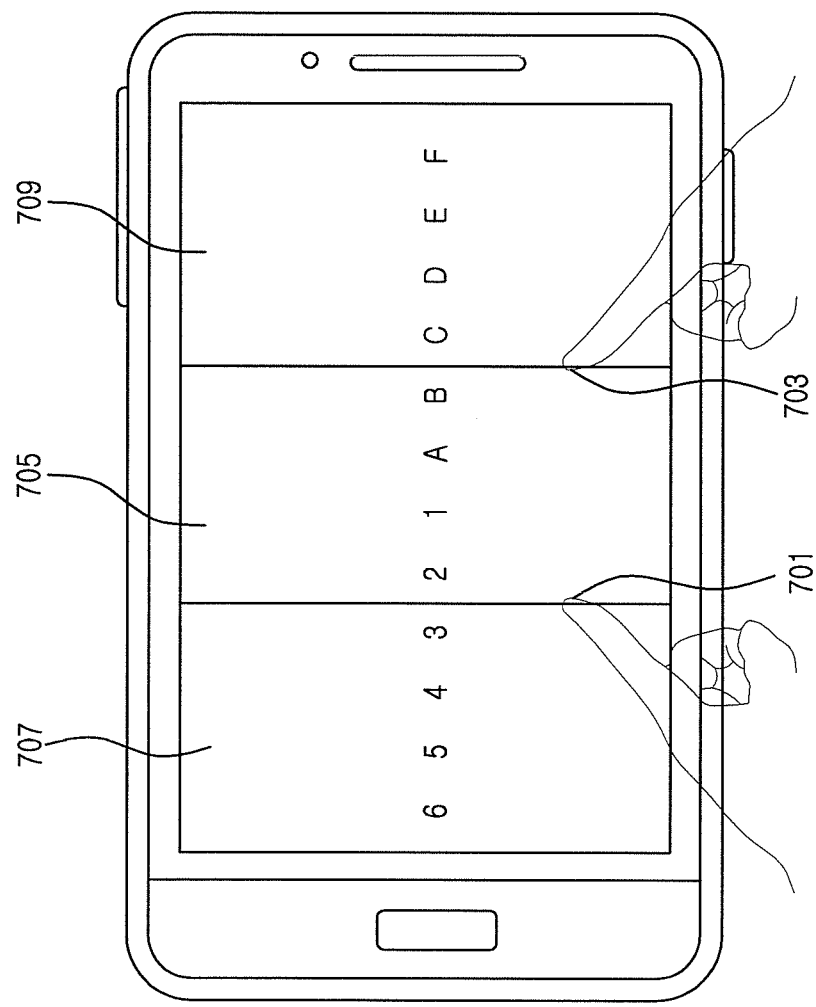

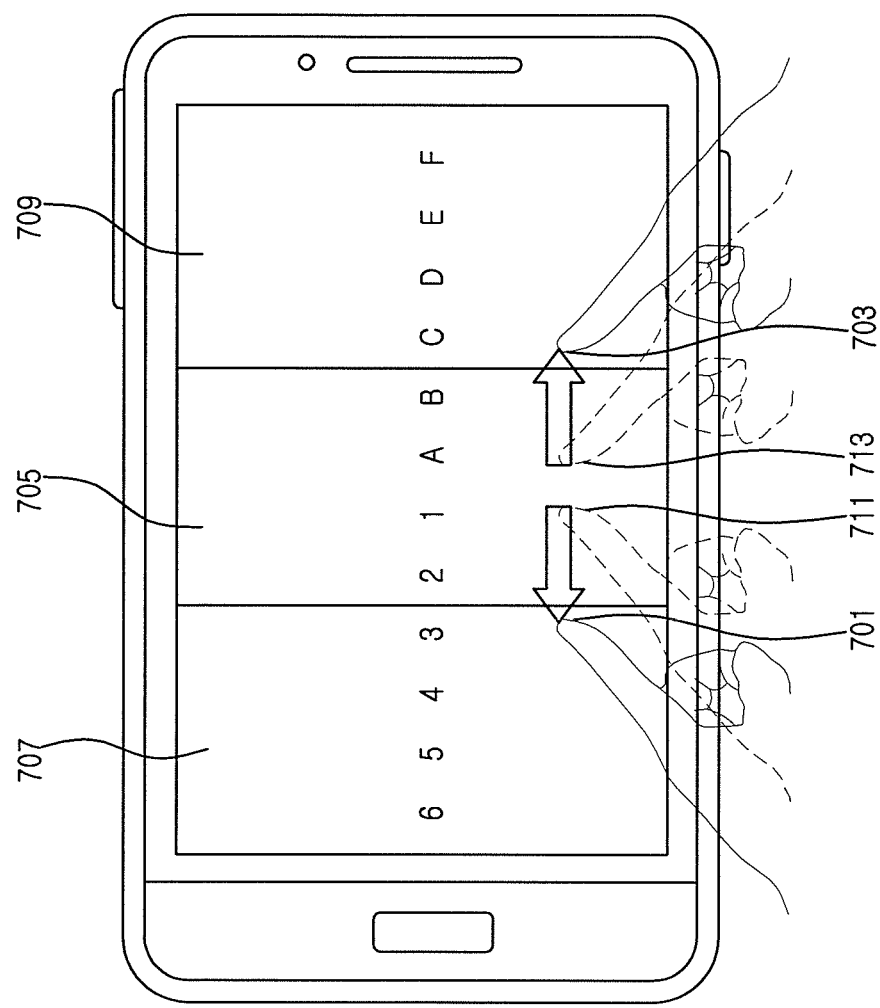

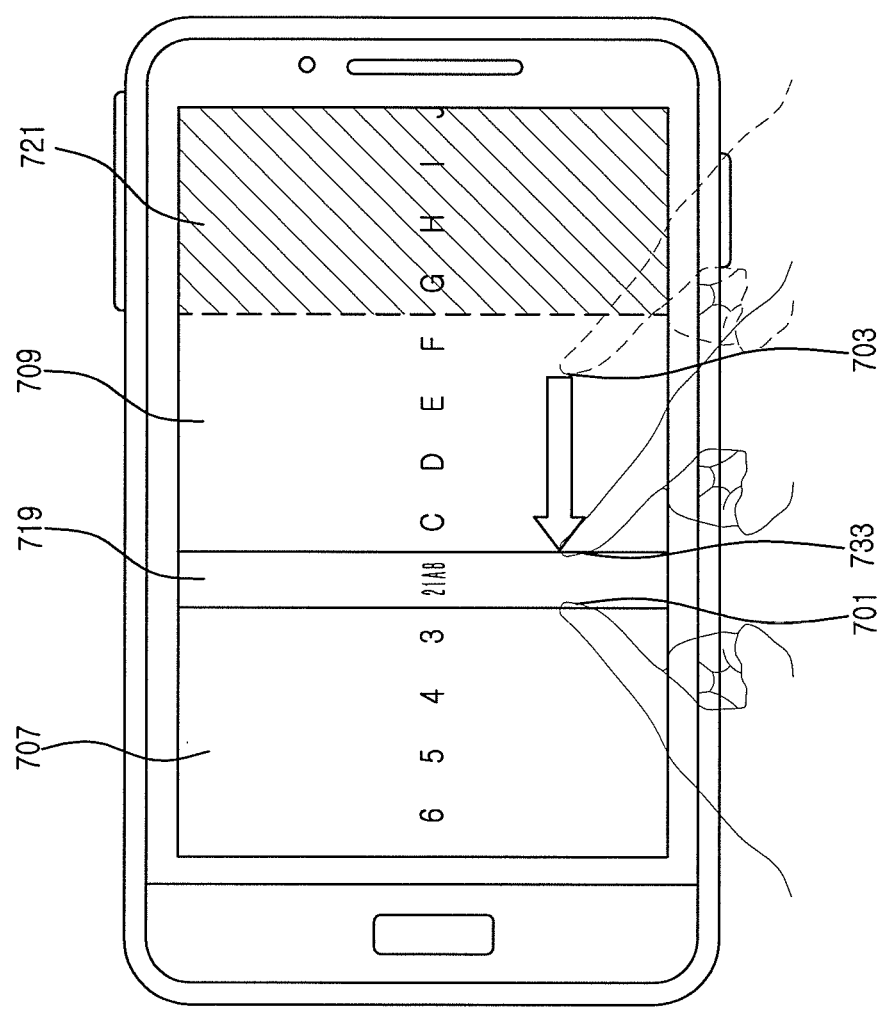

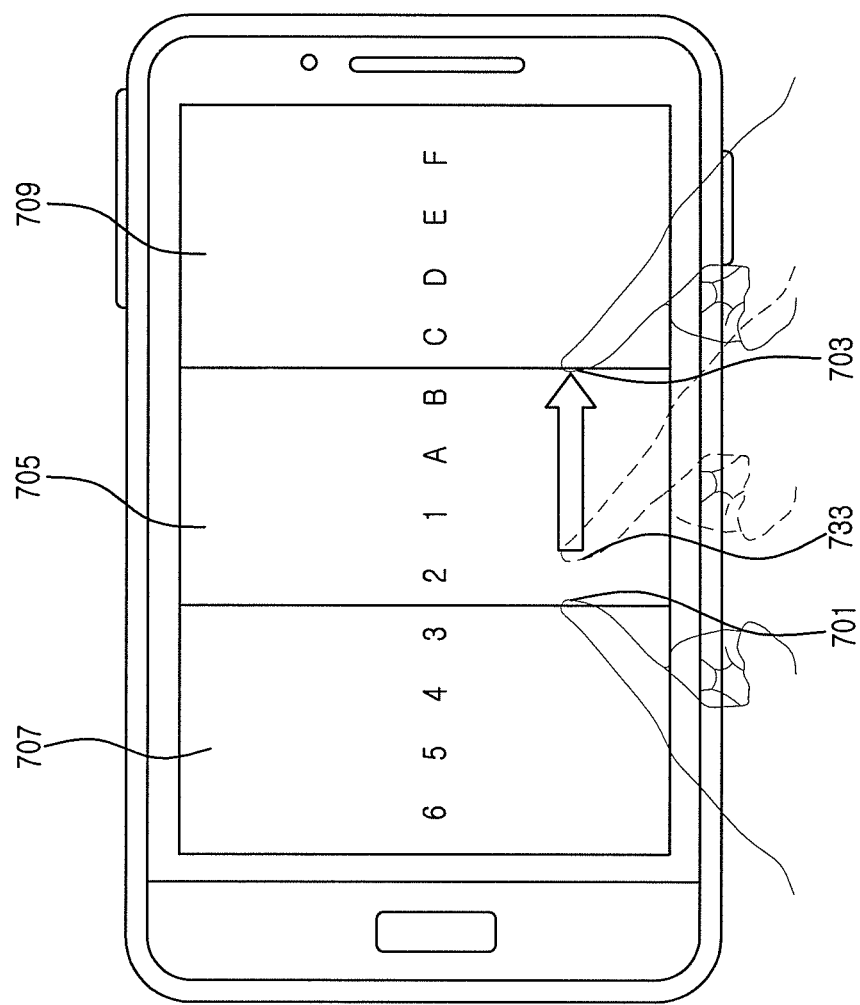

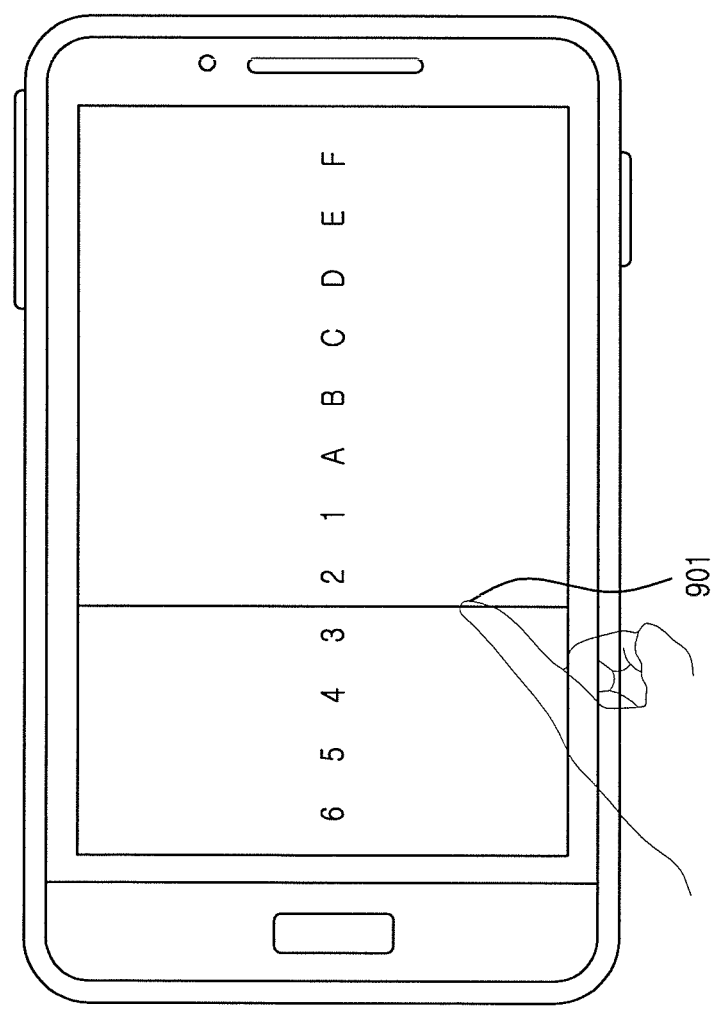

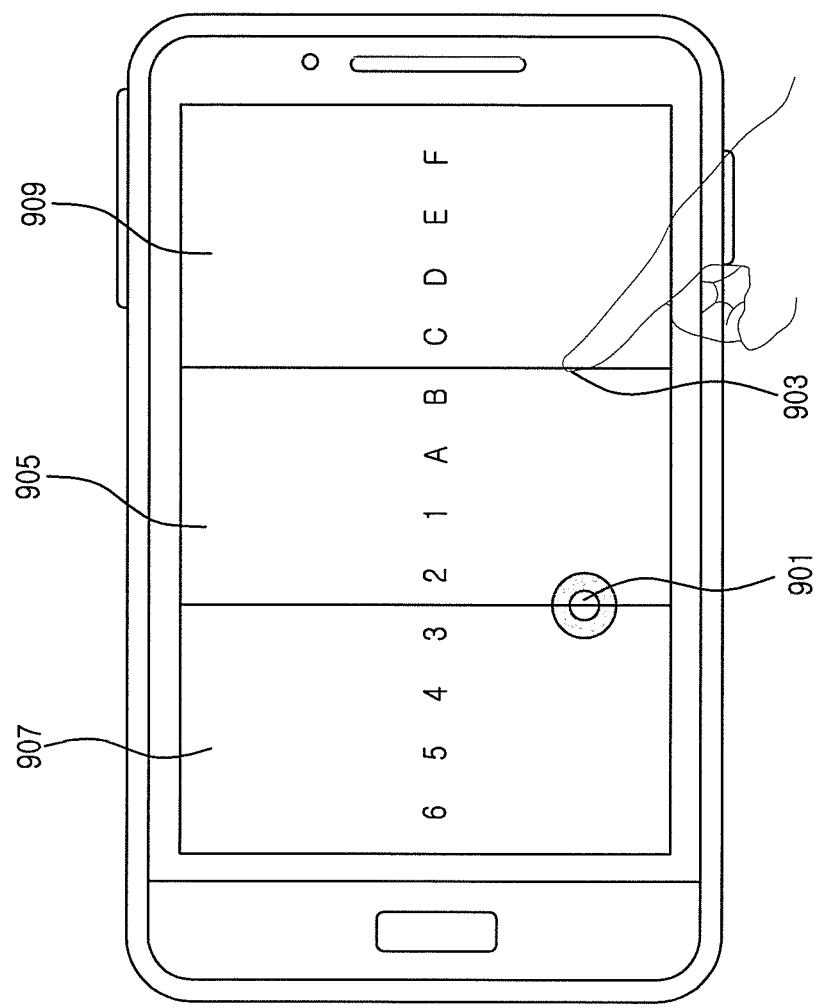

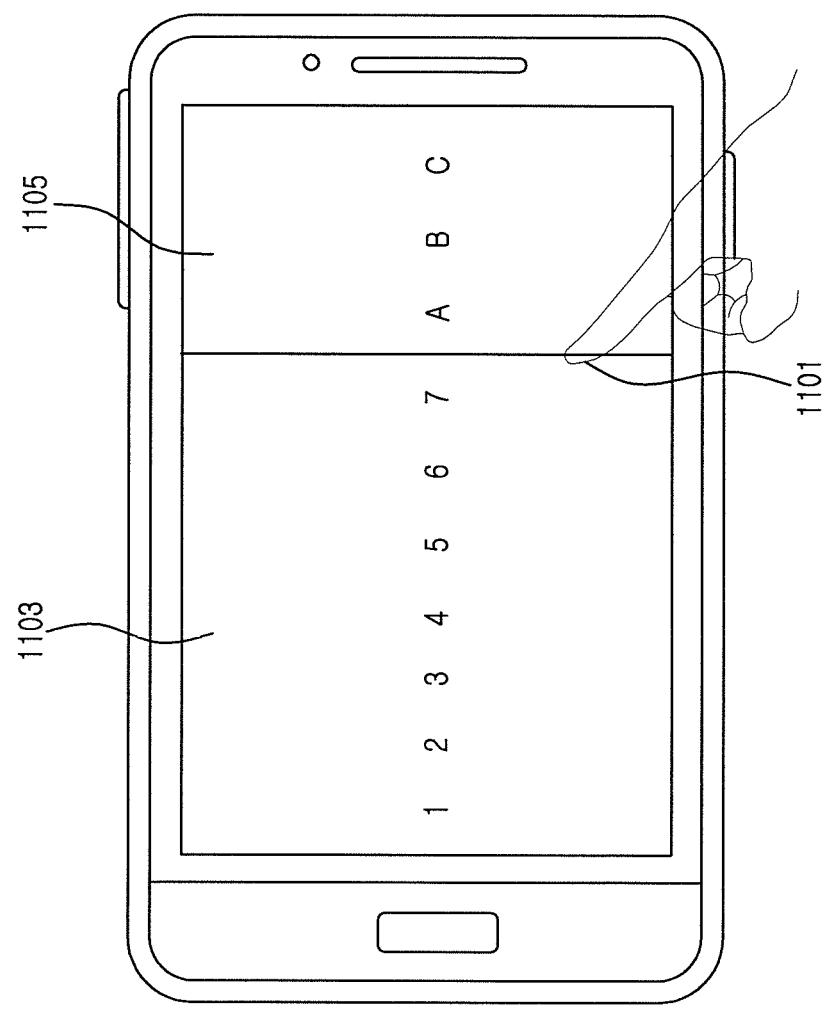

METHOD FOR CHANGING DISPLAY RANGE AND ELECTRONIC DEVICE THEREOF

CROSS-REFERENCE TO RELATED APPLICATION(S) AND CLAIM OF PRIORITY

The present application is related to and claims priority under 35 U.S.C. §119 to an application filed in the Korean Intellectual Property Office on Aug. 21, 2012 and assigned Serial No. 10-2012-0091181, the contents of which are incorporated herein by reference.

TECHNICAL FIELD

The present disclosure relates to a method for changing a display range in an electronic device having a touchscreen and an electronic device thereof.

BACKGROUND

Portable terminals have become necessary articles of modern persons due to their portability, and have evolved into multimedia devices that provide various services such as voice and video call functions, information input/output functions, and a data storage functions.

As usage of multimedia services using an electronic device increases, the amount of information to be processed by the electronic device and the amount of information to be displayed has increased. As a result, there is a growing interest in an electronic device having a touchscreen in which the space is efficiently used and the size of the display unit is increased.

The touchscreen is an input/output device for performing the input and display of information on one screen. Therefore, when the electronic device uses the touchscreen, a separate input device, such as a keypad can be removed from the electronic device, resulting in an increase of the display area. For example, when a full-touch screen in which the entire screen is touchable is used, the electronic device utilizes the entire front surface as a screen, leading to an increase of its screen display region.

Since an electronic device having a touchscreen does not use a separate input device, such as a keypad, a method for manipulating the electronic device needs to be modified. As a result, there is a need for a user interface for an electronic device having a touchscreen.

SUMMARY

To address the above-discussed deficiencies of the prior art, it is a primary object of the present disclosure to provide a method and device for changing a display range in an electronic device having a touchscreen.

Another object of the present disclosure is to provide a method and device for changing the display range of a display range change region in an electronic device having a touchscreen.

Another object of the present disclosure is to provide a method and device for changing the display range of a display range change region by changing the size of the contents of a reference region in an electronic device.

Another object of the present disclosure is to provide a method and device for changing the display range of a display range change region to be overlapped on a reference region in an electronic device.

Another object of the present disclosure is to provide a method and device for changing the display range of a display range change region in consideration of touch information in an electronic device.

Another object of the present disclosure is to provide a method and device for changing the display range of a display range change region in consideration of multi-touch information in an electronic device.

According to a first aspect of the present disclosure, a method for displaying a screen in an electronic device having a touchscreen includes: detecting a plurality of touches; determining a plurality of regions in consideration of a plurality of touch points; and changing a display range of at least one region of the plurality of regions in consideration of change in a distance between the plurality of touch points.

According to a second aspect of the present disclosure, a method for displaying a screen in an electronic device having a touchscreen includes: detecting a touch; determining a plurality of regions in consideration of a touch point; and changing a display range of at least one region of the plurality of regions of the plurality of regions in consideration of a drag direction and a drag distance of the touch.

According to a third aspect of the present disclosure, an electronic device includes: at least one processor; a memory; and at least one program stored in the memory and configured to be executable by the processor, wherein the program comprises at least one instruction for: detecting a plurality of touches; determining a plurality of regions in consideration of a plurality of touch points; and changing a display range of at least one region of the plurality of regions in consideration of change in a distance between the plurality of touch points.

According to a fourth aspect of the present disclosure, an electronic device includes: at least one processor; a memory; and at least one program stored in the memory and configured to be executable by the processor, wherein the program comprises at least one instruction for: detecting a touch; determining a plurality of regions in consideration of a touch point; and changing a display range of at least one region of the plurality of regions in consideration of change in a drag direction and drag distance of the touch.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A to 7F illustrate screen configurations of changing a display range in consideration of multi-touch information in an electronic device according to embodiments of the present disclosure;

FIGS. 9A to 9D illustrate screen configurations of changing a display range in consideration of touch information in an electronic device according to embodiments of the present disclosure;

FIGS. 11A to 11C illustrate screen configurations for changing a display range depending on whether a screen control event is activated in an electronic device according to embodiments of the present disclosure;

DETAILED DESCRIPTION OF THE INVENTION

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Certain embodiments of the present invention will be described herein below with reference to the accompanying drawings. In the following description, detailed descriptions of well-known functions or configurations will be omitted so as to not obscure the subject matter of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure provides a technique for changing a display range in an electronic device having a touchscreen.

In the following description, examples of the electronic device may include a mobile terminal having a touchscreen, a personal digital assistant (PDA), a laptop computer, a smart phone, a netbook, a television, a mobile internet device (MID), an ultra mobile personal computer (UMPC), a tablet PC, a navigation device, an MP3 player, and the like.

Figure 1:
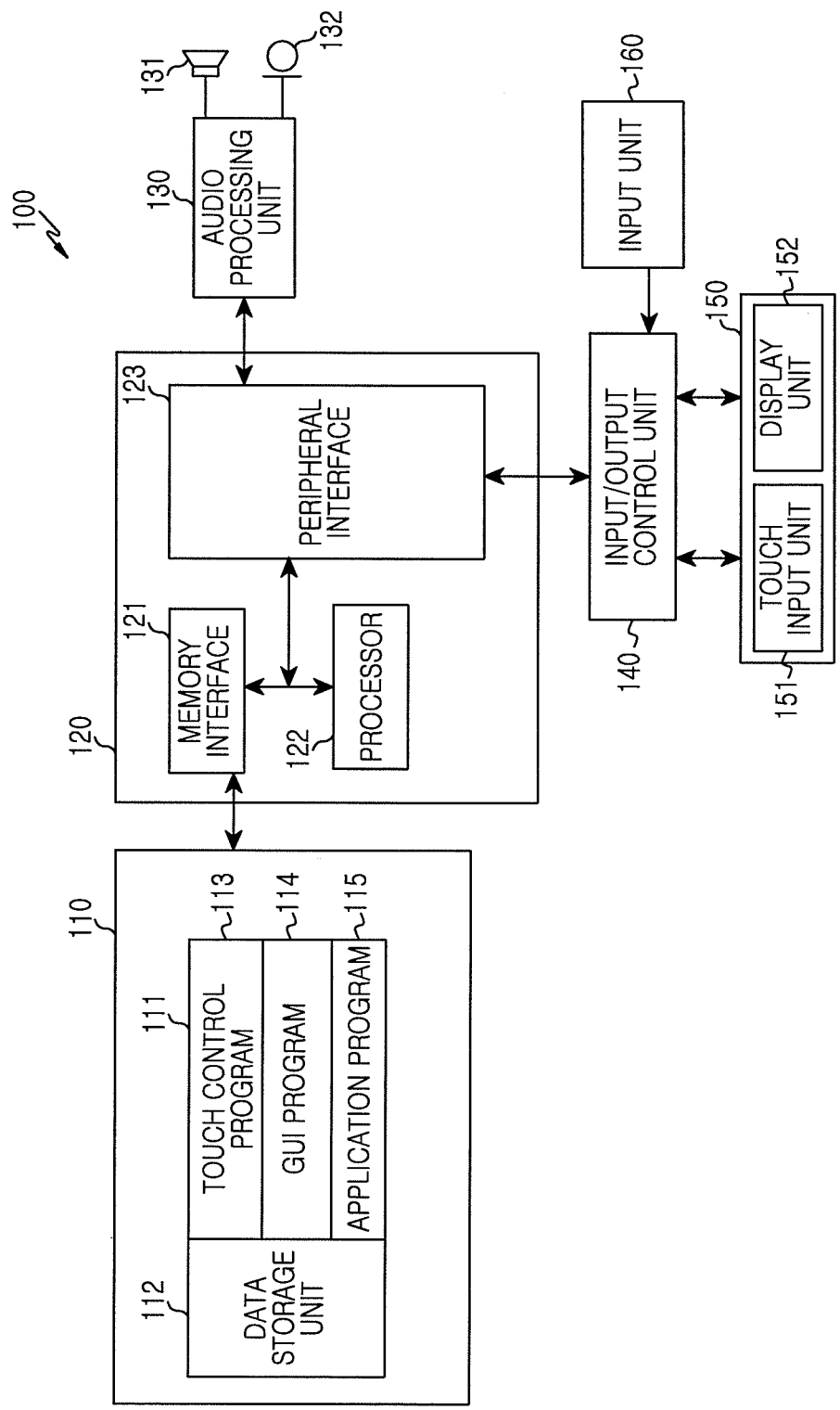
FIG. 1 illustrates a diagram of an electronic device having a touchscreen according to embodiments of the present disclosure.

FIG. 1 illustrates an electronic device having a touchscreen according to certain embodiments of the present disclosure.

Referring to FIG. 1, electronic device 100 includes memory 110, processor unit 120, audio processing unit 130, input/output control unit 140, touchscreen 150, and input unit 160. In this case, memory 110 may be provided in plurality.

The respective components will be described below.

Memory 110 may include program storage unit 111 for storing a program for controlling an operation of electronic device 100, and data storage unit 112 for storing data generated during the execution of a program. For example, program storage unit 111 includes touch control program 113, Graphic User Interface (GUI) program 114, and at least one application program 115. In this case, the programs stored in program storage unit 111 may be expressed as an instruction set that is a collection of instructions.

Touch control program 113 includes at lease one software component for processing touch information detected through touch input unit 151. In this case, the touch information includes at least one of a touch-down, a touch-up and a drag.

Graphic user interface program 114 includes at lease one software component for providing a graphic user interface on display unit 152. In this case, graphic user interface program 114 changes the display range of a display range change region in consideration of touch information detected by touch control program 113. For example, graphic user interface program 114 changes the display range of the display range change region according to change in a distance between multiple touch points. In this case, graphic user interface program 114 may change the size of the contents of a reference region according to change in a distance between multiple touch points to change the display range of the display range change region. In addition, graphic user interface program 114 may change the display range of the display range change region to be overlapped on the reference region according to change in a distance between multiple touch points.

In another example, when a screen control event is activated by a user's operation, graphic user interface program 114 may change the display range of the display range change region according to the drag direction of a touch. In this case, graphic user interface program 114 may change the display range of a first display range change region to be overlapped on a second display range change region according to the drag direction of a touch. In addition, graphic user interface program 114 may change the size of contents of the reference region according to the drag direction of a touch to change the display range of the display range change region.

Application program 115 includes a software component for at least one application program installed in electronic device 100.

Processor unit 120 may include memory interface 121, at least one processor 122, and peripheral interface 123. In this case, memory interface 121, at least one processor 122 and peripheral interface 123 which are included in processor unit 120, may be integrated into at least one integrated circuit or be implemented as separate components.

Memory interface 121 controls access to memory 100 by one or more components, such as processor 122 and peripheral interface 123.

Peripheral interface 123 controls connections of the input/output peripherals of electronic device 100 to processor 122 and memory interface 121.

Figure 2:
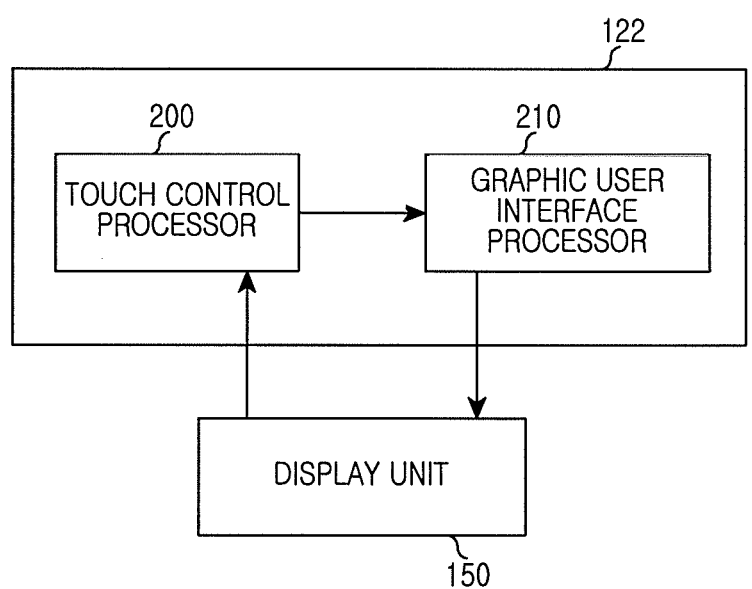
FIG. 2 illustrates a diagram of a processor according to embodiments of the present disclosure.

Processor 122 controls electronic device 100 to provide various multimedia services using at least one software program. In this case, processor 122 performs control to execute at least one program stored in memory 110 and provide a service according to a corresponding program. For example, processor 122 includes touch control processor 200 for executing touch control program 113, a display control processor for executing a display control program and graphic user interface processor 210 for executing graphic user interface program 114 as shown in FIG. 2.

Audio processing unit 130 provides an audio interface between a user and electronic device 100 through speaker 131 and microphone 132.

Input/output control unit 140 provides an interface between an input/output device, such as touchscreen 150, input unit 160, and peripheral interface 123.

Touchscreen 150 is an input/output device for performing the input and output of information and includes touch input unit 151 and display unit 152.

Touch input unit 151 provides touch information detected through a touch panel to processor unit 120 through input/output control unit 140. Touch input unit 151 provides touch information generated by an electronic pen or a finger to processor unit 120 through input/output control unit 140.

Display unit 152 displays the state information of electronic device 100, characters input by the user, moving pictures, still pictures, or the like. For example, display unit 152 displays display data provided from graphic user interface program 114.

Input unit 160 provides input data generated by the selection of the user to processor unit 120 through the input/output control unit 140. For example, input device 160 is configured by including only control buttons for control of electronic device 100. In another example, input device 160 may be configured by a keypad for receiving input data from the user.

Although not shown in drawings, electronic device 100 may further include a communication system for executing communication functions for voice communication and data communication. In this case, the communication system may be classified into a plurality of communication sub-modules which support different communication networks. For example, the communication networks may include, but are not limited to, a Global System for Mobile communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a wireless LAN, a Bluetooth network, a Near Field Communication (NFC) network, and the like.

FIG. 2 illustrates a detailed block configuration of a processor according to certain embodiments of the present disclosure.

Referring to FIG. 2, processor 122 includes touch control processor 200, and graphic user interface processor 210.

Touch control processor 200 executes touch control program 113 of program storage unit 111 and processes touch information detected through touch input unit 151. In this case, touch information includes at least one of a touch-down, a touch-up and a drag.

Graphic user interface processor 210 executes graphic user interface program 114 of program storage unit 111 to provide a user interface with graphics on display unit 162. In this case, graphic user interface processor 210 changes the display range of a display range change region in consideration of touch information detected by touch control processor 200. For example, graphic user interface processor 210 changes the display range of the display range change region according to change in a distance between multiple touch points. In this case, graphic user interface processor 210 may change a size of the contents of a reference region according to change in a distance between multiple touch points to change the display range of the display range change region. In addition, graphic user interface processor 210 may change the display range of the display range change region to be overlapped on the reference region according to change in a distance between multiple touch points.

In another example, when a screen control event is activated by a user's operation, graphic user interface processor 210 may change a display range of a display range change region according to a drag direction of a touch. In this case, graphic user interface processor 210 may change the display range of a first display range change region to be overlapped on a second display range change region according to the drag direction of the touch. In addition, graphic user interface processor 210 may change a size of contents of the reference region according to the drag direction of the touch to change the display range of the display range change region.

In certain embodiments, electronic device 100 includes touch control program 113 and graphic user interface program 114 in program storage unit 111 in order to change the display range of a reference region in consideration of touch information in the electronic device having a touchscreen. Accordingly, electronic device 100 executes the programs included in program storage unit 111 by the processor configured as in FIG. 2 to change the display range of the reference region in consideration of the touch information in the electronic device having the touchscreen.

In certain embodiments, electronic device 100 may perform control by using processor 122 including information about touch control program 113 and graphic user interface program 114. Specifically, processor 122 configured as in FIG. 2 may include information about touch control program 113 and graphic user interface program 114.

Figure 3A:
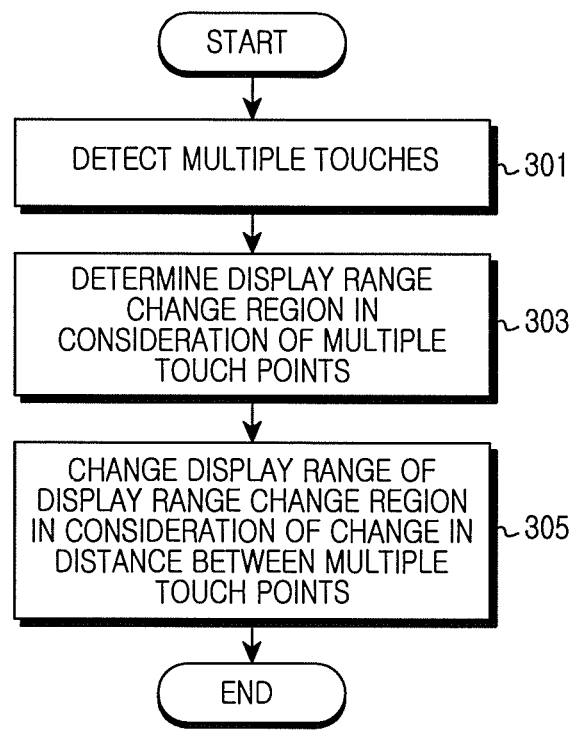
FIG. 3A illustrates a flow chart for changing a display range in consideration of multi-touch information in an electronic device according to embodiments of the present disclosure.

FIG. 3A illustrates a flow chart of changing a display range in consideration of multi-touch information in an electronic device according embodiments of the present disclosure.

Referring to FIG. 3A, when multiple touches are detected (step 301), in step 303, an electronic device determines a display range change region in consideration of multiple touch points. For example, as illustrated in FIG. 7A, when multiple touches on first point 701 and second point 703 are detected, the electronic device determines first display range change region 707, second display range change region 709 and first reference region 705 based on first point 701 and second point 703.

Figure 7B:
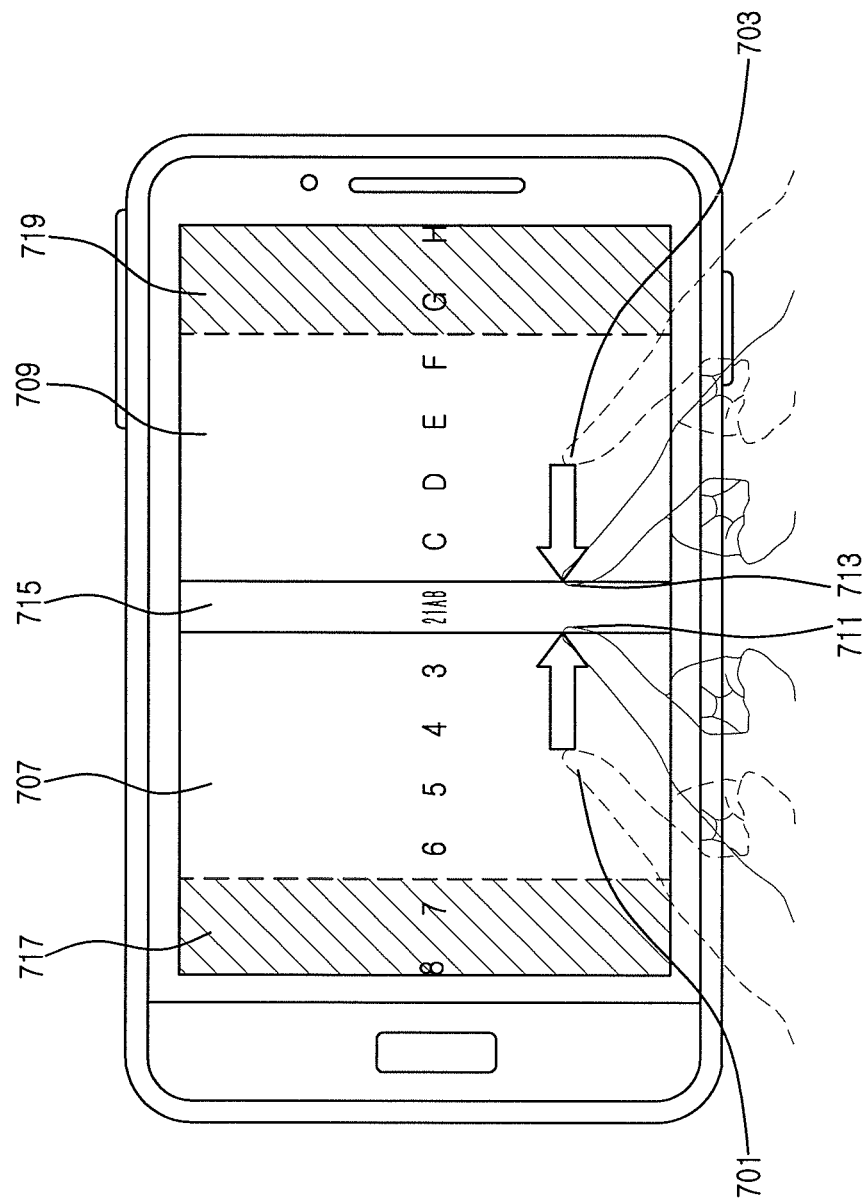
Figure 7F:
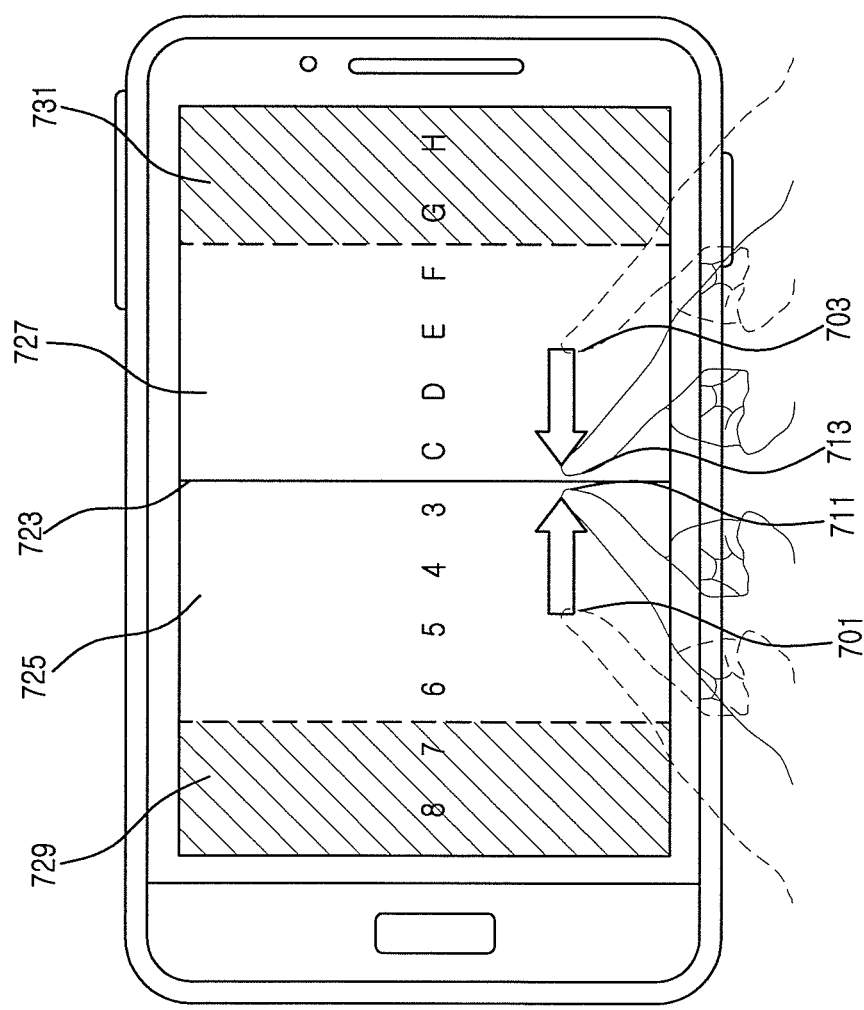

After determining the display range change regions in consideration of the multiple touch points, in step 305, the electronic device changes the display range of the display range change region in consideration of change in a distance between multiple touch points. For example, as illustrated in FIG. 7B, when drags from first point 701 and second point 703 to third point 711 and fourth point 713 are detected, the electronic device expands first display range change region 707 and second display range change region 709 in consideration of drag distances from first point 701 and second point 703 to third point 711 and fourth point 713, and then displays first outer region 717 and second outer region 719 which had not been displayed on the screen. In this case, the electronic device reduces a size of contents of first reference region 705 to fit second reference region 715 and displays the same as illustrated in FIG. 7B.

If, in a state in which first display range change region 707 and second display range change region 709 have been expanded as illustrated in FIG. 7B, drags from third point 711 and fourth point 713 to first point 701 and second point 703 are detected as illustrated in FIG. 7C, the electronic device may display first display range change region 707 and second display range change region 709 in consideration of the drag distances from third point 711 and fourth point 713 to first point 701 and second point 703. In this case, the electronic device may expand a size of contents of second reference region 715 to fit first reference region 705 and display the same as illustrated in FIG. 7C.

In certain embodiments, when a drag from second point 703 to fifth point 733 is detected, the electronic device may expand second display range change region 709 in consideration of a drag distance from second point 703 to fifth point 733, and display third outer region 721 which had not been displayed on the screen. In this case, the electronic device may reduce a size of the contents of first reference region 705 to fit third reference region 719, and display the same as illustrated in FIG. 7D.

If, in a state in which second display range change region 709 has been expanded as illustrated in FIG. 7D, a drag from fifth point 733 to second point 703 is detected as illustrated in FIG. 7E, the electronic device may display second display range change region 709 in consideration of a drag distance from fifth point 733 to second point 703. In this case, the electronic device may expand a size of the contents of third reference region 719 to fit first reference region 705 and display the same as illustrated in FIG. 7E.

Thereafter, the electronic device ends the algorithm.

In certain embodiments, when a display range of a display range change region is changed according to a first drag, the electronic device may restore the display range change region to an original condition according to a second drag.

In certain embodiments, the electronic device may restore a display range change region to an original condition through a display range change region-restoration event. In this case, the display range change region-restoration event may be generated by one or more of a touch gesture, a menu selection, and a button input.

Figure 3B:
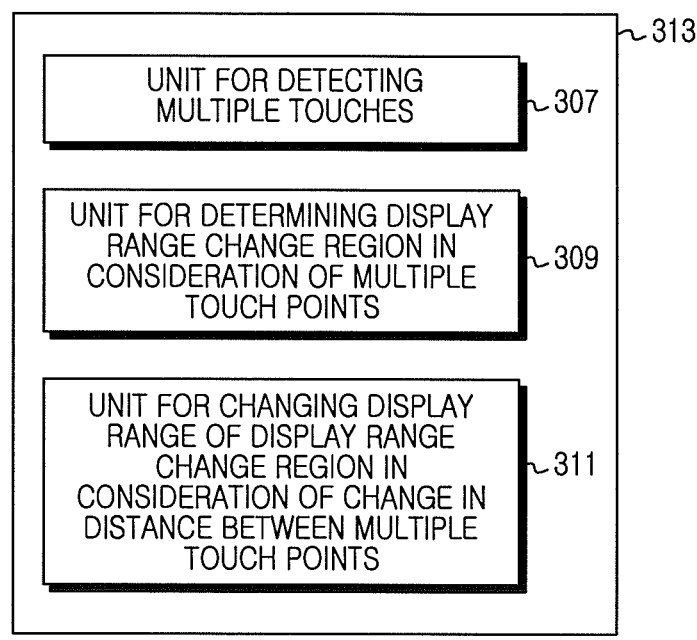
FIG. 3B illustrates a configuration of an electronic device for changing a display range in consideration of multi-touch information in an according to embodiments of the present disclosure.

As described above, respective processes for changing a display range of a reference region in consideration of touch information in the electronic device having a touchscreen may be implemented by a device for changing the display range of a reference region in consideration of touch information in the electronic device having a touchscreen as illustrated in FIG. 3B.

FIG. 3B illustrates a configuration of an electronic device for changing a display range in consideration of multi-touch information in an according certain embodiments of the present disclosure.

Referring to FIG. 3B, electronic device 313 includes first unit 307 for detecting multiple touches, second unit 309 for determining a display range change region in consideration of the multiple touch points and third unit 311 for changing the display range of the display range change region in consideration of change in a distance between multiple touch points.

First unit 307 detects multiple touches through a display unit, such as display unit 150 of FIG. 1, of electronic device 313.

Second unit 309 determines the reference region in consideration of the multiple touch points. For example, as illustrated in FIG. 7A, when multiple touches on first point 701 and second point 703 are detected, electronic device 313 determines first display range change region 707, second display range change region 709 and first reference region 705 based on first point 701 and second point 703.

The third unit 311 changes the display range of the reference region in consideration of change in a distance between multiple touch points. For example, as illustrated in FIG. 7B, when drags from first point 701 and second point 703 to third point 711 and fourth point 713 are detected, electronic device 313 expands the first display range change region 707 and the second display range change region 709 in consideration of the drag distances from first point 701 and second point 703 to third point 711 and fourth point 713, and then displays first outer region 717 and second outer region 719 which had not been displayed on the screen. In this case, electronic device 313 reduces the size of the contents of first reference region 705 to fit reference region 715 and displays the same as illustrated in FIG. 7B.

If, in a state in which first display range change region 707 and the second display range change region 709 have been expanded as illustrated in FIG. 7B, drags from third point 711 and fourth point 713 to first point 701 and second point 703 are detected as illustrated in FIG. 7C, electronic device 313 may display the first display range change region 707 and the second display range change region 709 in consideration of the drag distances from third point 711 and fourth point 713 to first point 701 and second point 703. In this case, electronic device 313 may expand the size of the contents of second reference region 715 to fit first reference region 705 and display the same as illustrated in FIG. 7C.

In certain embodiments, when a drag from second point 703 to fifth point 733 is detected as illustrated in FIG. 7D, electronic device 313 may expand the second display range change region 709 in consideration of the drag distance from second point 703 to fifth point 733, and display third outer region 721 which had not been displayed on the screen. In this case, electronic device 313 may reduce the size of the contents of first reference region 705 to fit third reference region 719, and display the same as illustrated in FIG. 7D.

If, in a state in which second display range change region 709 has been expanded as illustrated in FIG. 7D, a drag from fifth point 733 to second point 703 is detected as illustrated in FIG. 7E, electronic device 313 may display the second display range change region 709 in consideration of the drag distance from fifth point 733 to second point 703. In this case, the electronic device may expand the size of the contents of third reference region 719 to fit first reference region 705 and display the same as illustrated in FIG. 7E.

As described above, the electronic device having a touchscreen includes respective units for changing the display range of a reference region in consideration of touch information. In this case, the electronic device having a touchscreen may configure the respective units for changing the display range of a reference region in consideration of touch information as one unit.

Figure 4A:
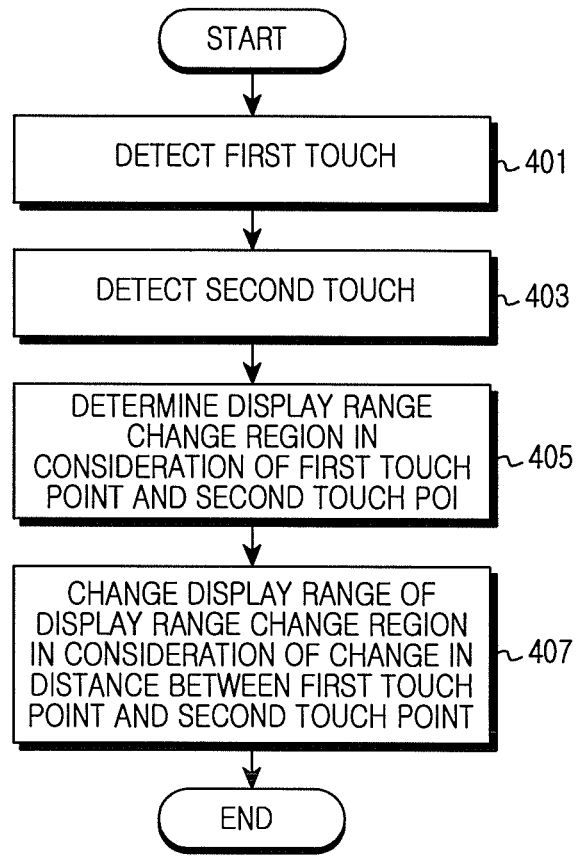
FIG. 4A illustrates a flow chart for changing a display range in consideration of touch information in an electronic device according to embodiments of the present disclosure.

FIG. 4A illustrates a flow chart of changing a display range in consideration of touch information in an electronic device according to certain embodiments of the present disclosure.

Referring to FIG. 4A, in step 401, the electronic device detects a first touch. For example, when a touch on first point 901 is maintained for a predetermined time as illustrated in FIG. 9A, the electronic device recognizes that a screen control event is activated.

When the screen control event is activated by the first touch, in step 403, the electronic device, the electronic device detects a second touch.

After detecting a second touch, in step 405, the electronic device determines a display range change region in consideration of a first touch point and a second touch point. For example, when a touch on second point 903 is detected as illustrated in FIG. 9B, the electronic device determines first display range change region 907, second display range change region 909 and first reference region 905 in consideration of first point 901 and second point 903.

Figure 9C:
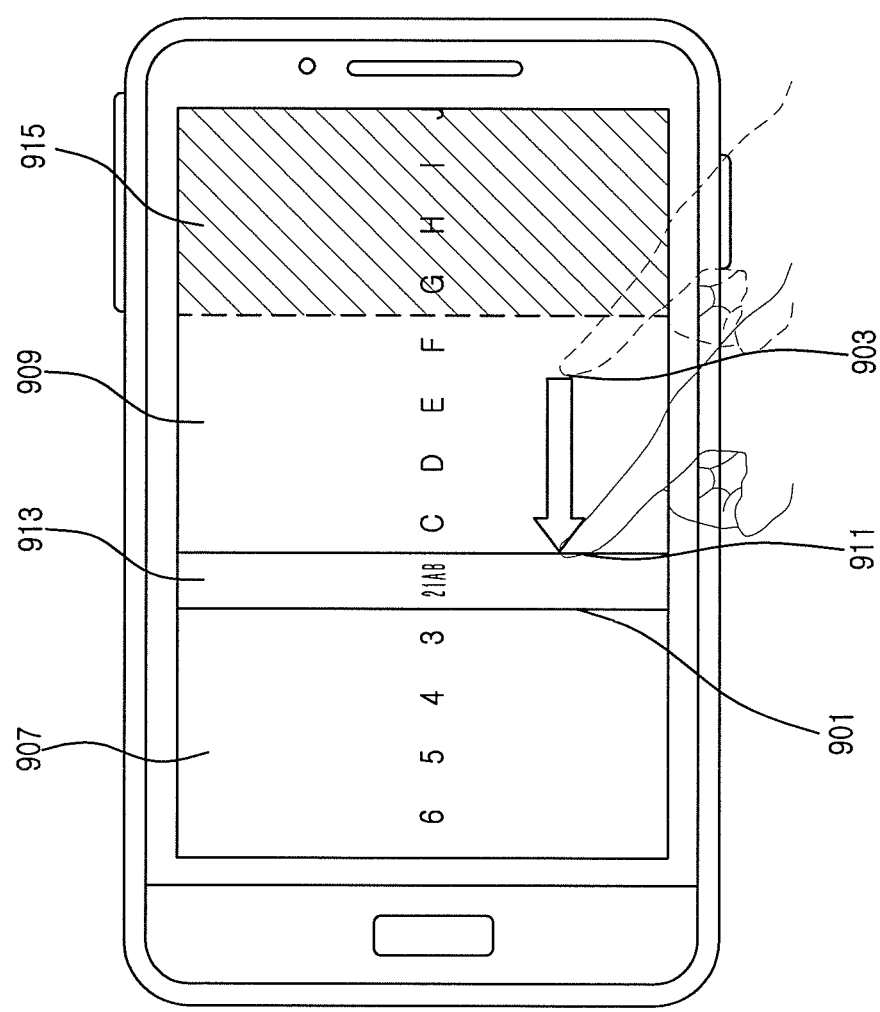

When change in a distance between the first touch point and the second touch point is detected, in step 407, the electronic device changes the display range of the display range change region in consideration of the change in a distance between the first touch point and the second touch point. For example, when a drag from second point 903 to third point 911 is detected as illustrated in FIG. 9C, the electronic device expands the second display range change region 909 in consideration of the drag distance from second point 903 to third point 911, and displays first outer region 915 which had not been displayed on the screen. In this case, the electronic device reduces the size of the contents of first reference region 905 to fit second reference region 913 and displays the same as illustrated in FIG. 9C.

Figure 9D:
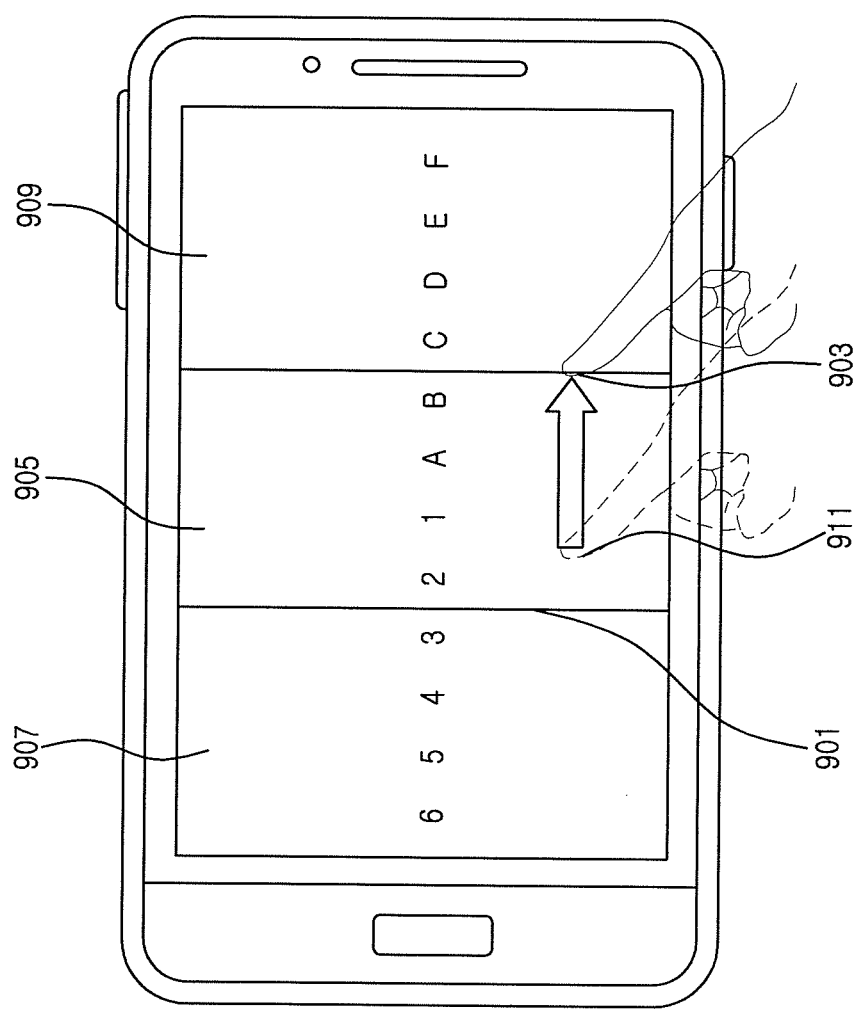

If, in a state in which second display range change region 909 has been expanded as illustrated in FIG. 9C, a drag from third point 911 to second point 903 is detected as illustrated in FIG. 9D, the electronic device may display the second display range change region 909 in consideration of the drag distance from third point 911 to second point 903. In this case, the electronic device may expand the size of the contents of second reference region 913 to fit first reference region 905 and display the same as illustrated in FIG. 9D.

Thereafter, the electronic device ends the algorithm.

In certain embodiments, when the display range of the display range change region is changed according to a first drag, the electronic device may restore the display range change region to an original condition according to a second drag.

In certain embodiments, the electronic device may restore the display range change region to an original condition through a display range change region-restoration event. In this case, the display range change region-restoration event may be generated by one or more of a touch gesture, a menu selection, and a button input.

Figure 4B:
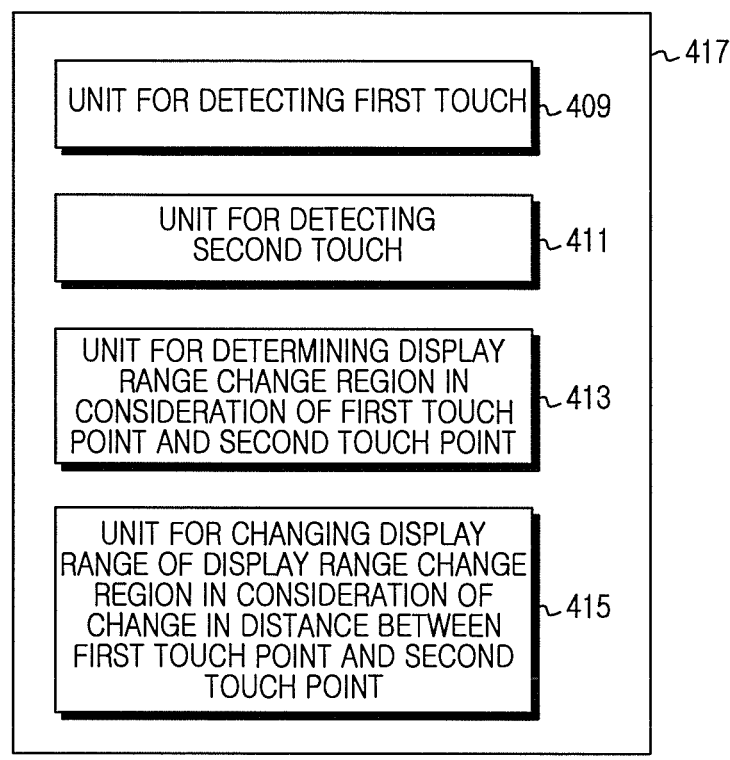
FIG. 4B illustrates a configuration of an electronic device for changing a display range in consideration of touch information in an according to embodiments of the present disclosure.

As described above, respective processes for changing the display range of a reference region in consideration of touch information in the electronic device having a touchscreen may be implemented by a device for changing the display range of a reference region in consideration of touch information in the electronic device having a touchscreen as illustrated in FIG. 4B.

FIG. 4B illustrates a configuration of electronic device 417 for changing a display range in consideration of touch information in an according to certain embodiments of the present disclosure.

Referring to FIG. 4B, electronic device 417 includes first unit 409 for detecting a first touch, second unit 411 for detecting a second touch, third unit 413 for determining a display range change region in consideration of a first touch point and a second touch point, and fourth unit 415 for changing the display range of the display range change region in consideration of change in a distance between the first touch point and the second touch point.

First unit 409 detects the first touch through a display unit, such as display unit 150 of FIG. 1, of electronic device 417. For example, when a touch on first point 901 is maintained for a predetermined time as illustrated in FIG. 9A, electronic device 417 recognizes that a screen control event is activated.

Second unit 411 detects the second touch through the display unit of electronic device 417.

Third unit 413 determines the display range change region in consideration of the first touch point and the second touch point. For example, when a touch on second point 903 is detected as illustrated in FIG. 9B, electronic device 417 determines first display range change region 907, second display range change region 909 and first reference region 905 in consideration of first point 901 and second point 903.

Fourth unit 415 changes the display range of the reference region in consideration of a change in a distance between a first touch point and a second touch point. For example, when a drag from second point 903 to third point 911 is detected as illustrated in FIG. 9C, electronic device 417 expands second display range change region 909 in consideration of a drag distance from second point 903 to third point 911, and displays first outer region 915 which had not been displayed on the screen. In this case, electronic device 417 reduces the size of the contents of first reference region 905 to fit second reference region 913 and displays the same as illustrated in FIG. 9C.

If, in a state in which second display range change region 909 has been expanded as illustrated in FIG. 9C, a drag from third point 911 to second point 903 is detected as illustrated in FIG. 9D, electronic device 417 may display the second display range change region 909 in consideration of the drag distance from third point 911 to second point 903. In this case, electronic device 417 may expand the size of the contents of second reference region 913 to fit first reference region 905 and display the same as illustrated in FIG. 9D.

As described above, electronic device 417 having a touchscreen includes respective units for changing a display range of a reference region in consideration of touch information. In this case, electronic device 417 having a touchscreen may configure the respective units for changing the display range of a reference region in consideration of touch information as one unit.

Figure 5A:
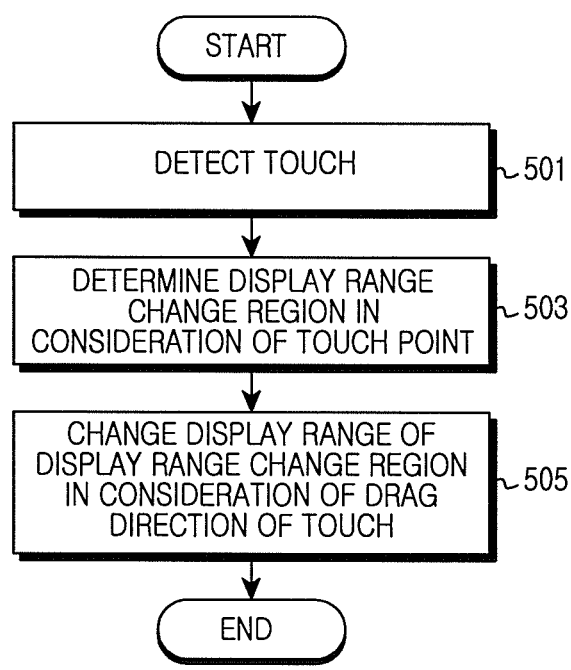
FIG. 5A illustrates a flow chart for changing a display range in consideration of touch information in an electronic device according to embodiments of the present disclosure.

FIG. 5A illustrates a flow chart of changing a display range in consideration of touch information in an electronic device according to certain embodiments of the present disclosure.

Referring to FIG. 5A, in step 501, the electronic device detects a touch. For example, when a touch on first point 1001 is maintained for a predetermined time as illustrated in FIG. 10A, the electronic device recognizes that a screen control event is activated.

After detecting the touch, in step 503, the electronic device determines a display range change region in consideration of a touch point. For example, as illustrated in FIG. 11A, when a touch on first point 1101 is detected, the electronic device determines first display range change region 1103 and second display range change region 1105 based on first point 1101.

Figure 11B:
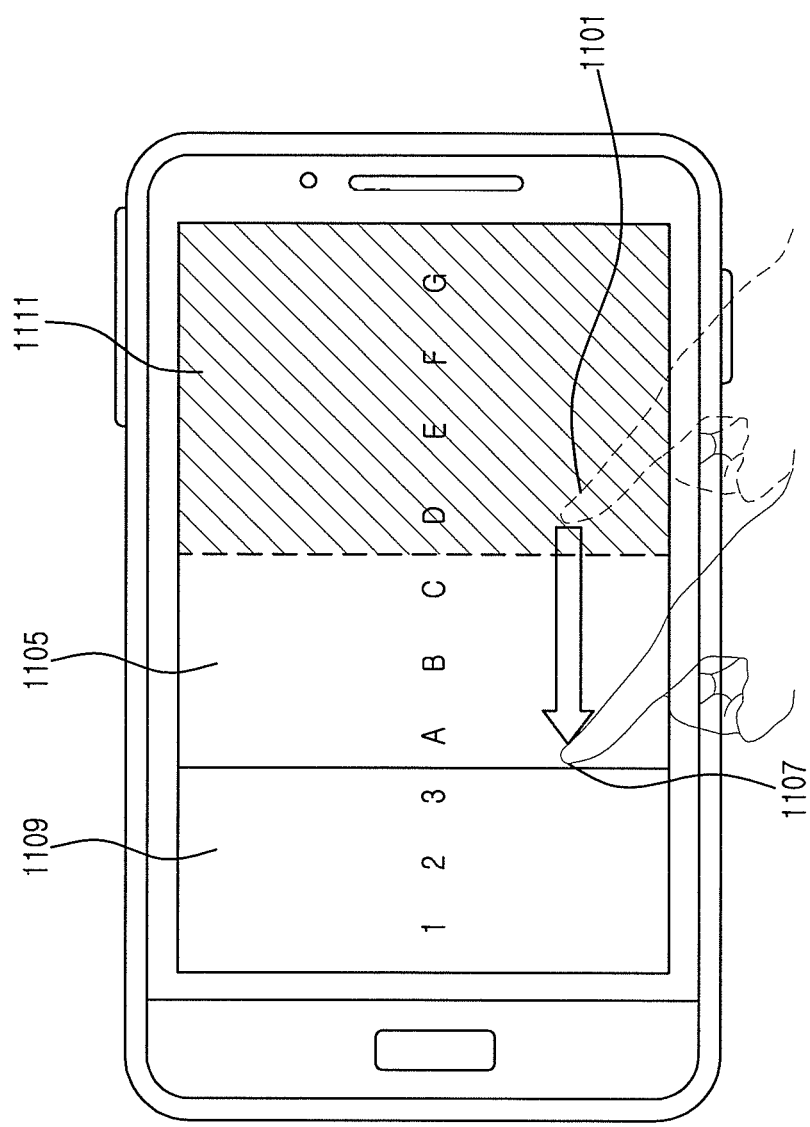

After determining the display range change region in consideration of the touch point, in step 505, the electronic device changes a display range of a display range change region in consideration of a drag direction of the touch. For example, when a drag from first point 1101 to second point 1107 is detected as illustrated in FIG. 11B, the electronic device expands second display range change region 1105 in consideration of the drag distance from first point 1101 to second point 1107, and displays first outer region 1111 which had not been displayed on the screen. In this case, the electronic device displays first display range change region 1109 to be overlapped by second display range change region 1105 and first outer region 1111 in consideration of the drag distance from first point 1101 to second point 1107.

Figure 11C:
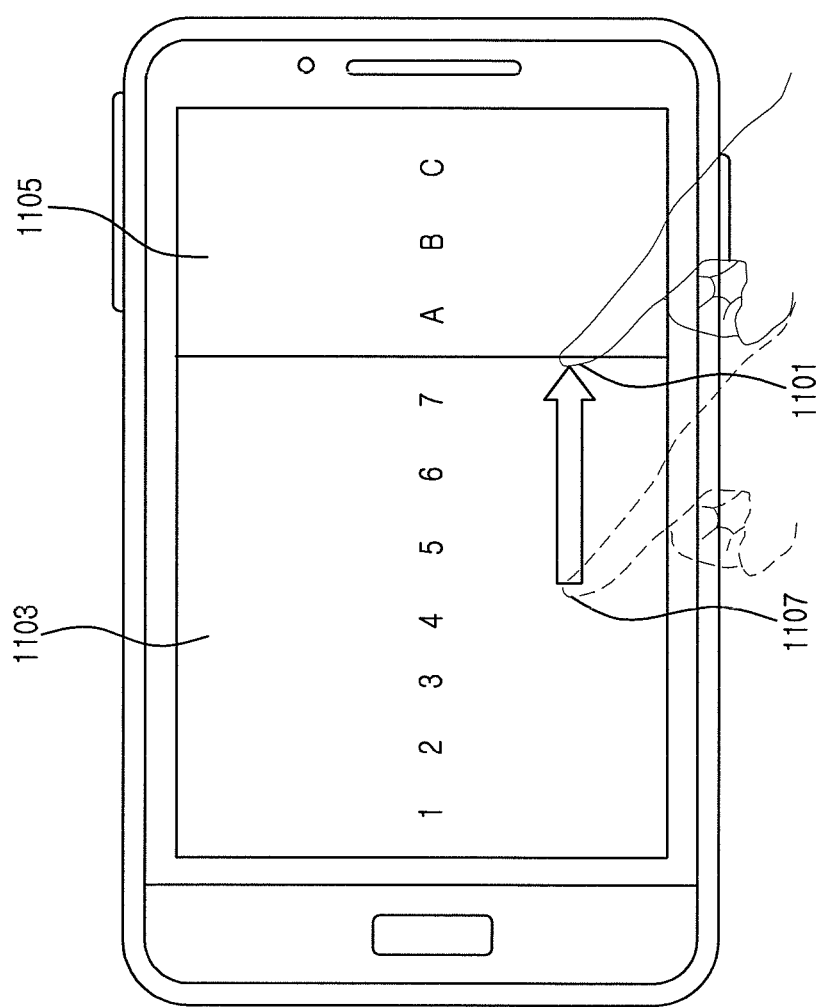

If, in a state in which second display range change region 1105 has been expanded as illustrated in FIG. 11B, a drag from second point 1107 to first point 1101 is detected as illustrated in FIG. 11C, the electronic device may display second display range change region 1105 in consideration of the drag distance from second point 1107 to first point 1101. In this case, the electronic device may display first display range change region 1109 in consideration of the drag distance from second point 1107 to first point 1101.

Thereafter, the electronic device ends the algorithm.

In certain embodiments, when the display range of the display range change region is changed according to a drag, the electronic device may restore the display range change region to an original condition according to a drag.

In certain embodiments, the electronic device may restore the display range change region to an original condition through a display range change region-restoration event. In this case, the display range change region-restoration event may be generated by one or more of a touch gesture, a menu selection, and a button input.

Figure 5B:
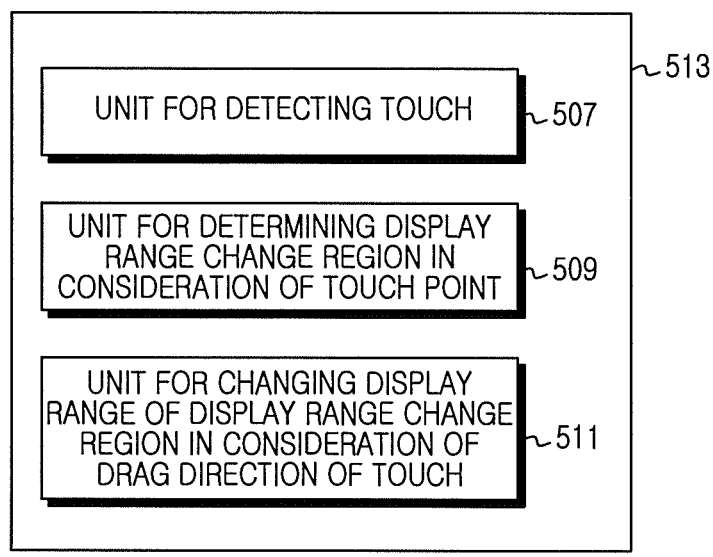
FIG. 5B illustrates a configuration of an electronic device for changing a display range in consideration of touch information in an according to embodiments of the present disclosure.

As described above, respective processes for changing the display range of a reference region in consideration of touch information in the electronic device having a touchscreen may be implemented by a device for changing the display range of a reference region in consideration of touch information in electronic device 513 having a touchscreen as illustrated in FIG. 5B.

FIG. 5B illustrates a configuration of electronic device 513 for changing a display range in consideration of touch information in an according to certain embodiments of the present disclosure.

Referring to FIG. 5B, electronic device 513 includes first unit 507 for detecting a touch, second unit 509 for determining a display range change region in consideration of a touch point and third unit 511 for changing the display range of the display range change region in consideration of the drag direction of the point.

First unit 507 detects a touch through a display unit, such as display unit 150 of FIG. 1, of electronic device 513. For example, when a touch on first point 1001 is maintained for a predetermined time as illustrated in FIG. 10A, electronic device 513 recognizes that a screen control event is activated.

Second unit 509 determines the display range change region in consideration of the touch point. For example, when a touch on first point 1101 is detected, as illustrated in FIG. 11A, electronic device 513 determines first display range change region 1103 and second display range change region 1105 based on first point 1101.

Third unit 511 changes the display range of the display range change region in consideration of the drag direction of the touch. For example, when a drag from first point 1101 to second point 1107 is detected as illustrated in FIG. 11B, electronic device 513 expands second display range change region 1105 in consideration of the drag distance from first point 1101 to second point 1107, and displays first outer region 1111 which had not been displayed on the screen. In this case, electronic device 513 displays first display range change region 1109 to be overlapped by second display range change region 1105 and first outer region 1111 in consideration of the drag distance from first point 1101 to second point 1107.

If, in a state in which second display range change region 1105 has been expanded as illustrated in FIG. 11B, a drag from second point 1107 to first point 1101 is detected as illustrated in FIG. 11C, electronic device 513 may display second display range change region 1105 in consideration of the drag distance from second point 1107 to first point 1101. In this case, electronic device 513 may display first display range change region 1109 in consideration of the drag distance from second point 1107 to first point 1101.

As described above, electronic device 513 having a touchscreen includes respective units for changing the display range of a reference region in consideration of touch information. In this case, electronic device 513 having a touchscreen may configure the respective units for changing the display range of a reference region in consideration of touch information as one unit.

Figure 6:
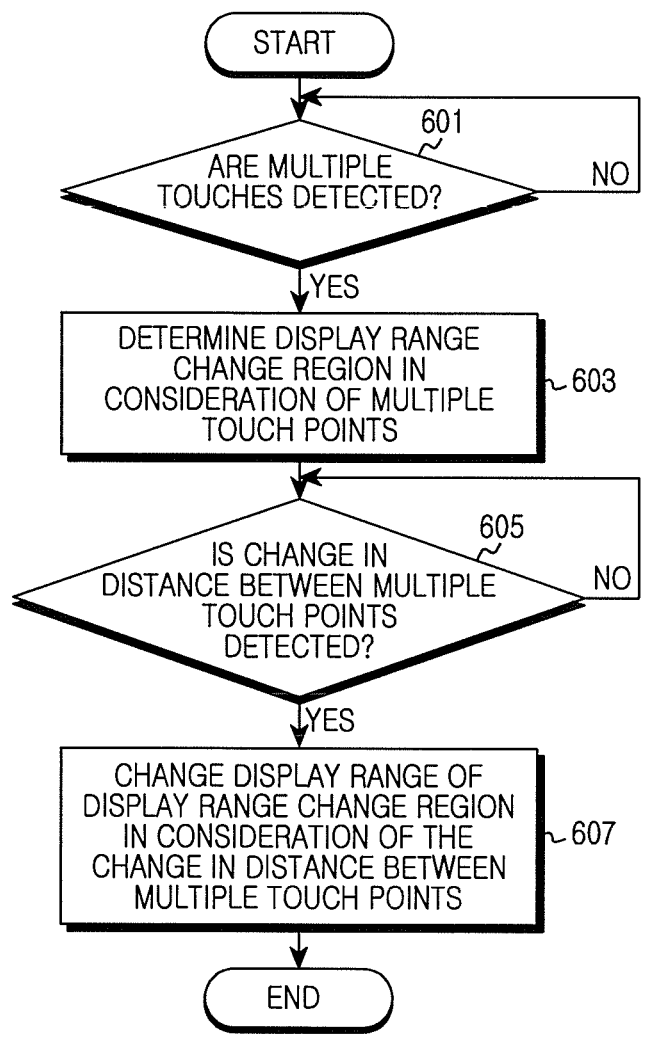
FIG. 6 illustrates a flow chart of changing a display range in consideration of multi-touch information in an electronic device according to embodiments of the present disclosure.

FIG. 6 illustrates a flow chart of changing a display range in consideration of multi-touch information in an electronic device according to certain embodiments of the present disclosure.

Referring to FIG. 6, in step 601, the electronic device checks whether multiple touches are detected.

When the multiple touches are detected, in step 603, the electronic device determines a display range change region in consideration of multiple touch points. For example, when multiple touches on first point 701 and second point 703 are detected as illustrated in FIG. 7A, the electronic device determines first display range change region 707, second display range change region 709 and first reference region 705 based on first point 701 and second point 703.

After determining the display range change region in consideration of the multiple touch points, in step 605, the electronic device detects change in distance between multiple touch points. For example, as illustrated in FIG. 7B, the electronic device checks whether the touches detected on first point 701 and second point 703 respectively move to third point 711 and fourth point 713.

In another example, the electronic device, as illustrated in FIG. 7D, may check whether a touch detected on second point 703 moves to third point 711 and fifth point 733.

When change in a distance between a multiple touch points, in step 607, the electronic device changes the display range of the display range change region in consideration of the change in the distance between the multiple touch points. For example, when drags from first point 701 and second point 703 to third point 711 and fourth point 713 are detected as illustrated in FIG. 7B, the electronic device expands first display range change region 707 and second display range change region 709 in consideration of drag distances from first point 701 and second point 703 to third point 711 and fourth point 713, and then displays first outer region 717 and second outer region 719 which had not been displayed on the screen. In this case, the electronic device reduces a size of contents of first reference region 705 to fit second reference region 715 and displays the same as illustrated in FIG. 7B.

If, in a state in which first display range change region 707 and second display range change region 709 have been expanded as illustrated in FIG. 7B, drags from third point 711 and fourth point 713 to first point 701 and second point 703 are detected as illustrated in FIG. 7C, the electronic device may display first display range change region 707 and second display range change region 709 in consideration of the drag distances from third point 711 and fourth point 713 to first point 701 and second point 703. In this case, the electronic device expands the size of the contents of second reference region 715 to fit first reference region 705 and displays the same as illustrated in FIG. 7C.

In certain embodiments, when a drag from second point 703 to fifth point 733 is detected as illustrated in FIG. 7D, the electronic device may expand second display range change region 709 in consideration of the drag distance from second point 703 to fifth point 733, and display third outer region 721 which had not been displayed on the screen. In this case, the electronic device may reduce a size of contents of first reference region 705 to fit third reference region 719, and display the same as illustrated in FIG. 7D.

If, in a state in which second display range change region 709 has been expanded as illustrated in FIG. 7D, a drag from fifth point 733 to second point 703 is detected as illustrated in FIG. 7E, the electronic device may display second display range change region 709 in consideration of the drag distance from fifth point 733 to second point 703. In this case, the electronic device may expand the size of the contents of third reference region 719 to fit first reference region 705 and display the same as illustrated in FIG. 7E.

Thereafter, the electronic device ends the algorithm.

In certain embodiments, when a display range of a display range change region is changed according to a first drag, the electronic device may restore the display range change region to an original condition according to a second drag.

In certain embodiments, the electronic device may restore the display range change region to an original condition through a display range change region-restoration event. In this case, the display range change region-restoration event may be generated by one or more of a touch gesture, a menu selection, and a button input.

Figure 8:
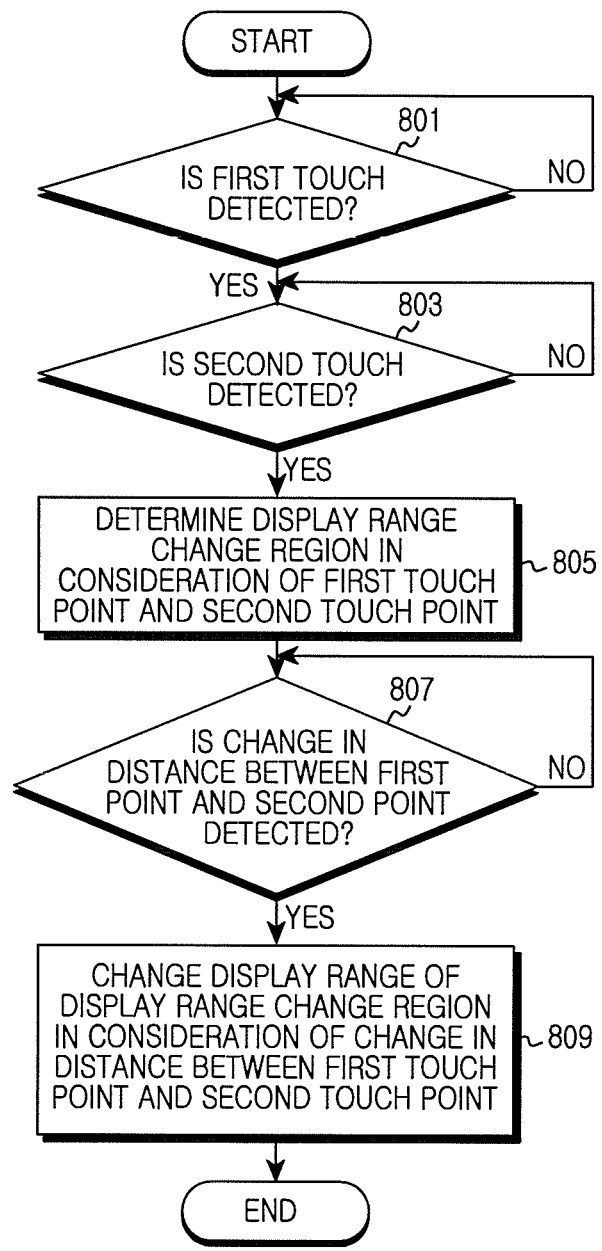
FIG. 8 illustrates a flow chart of changing a display range in consideration of touch information in an electronic device according to embodiments of the present disclosure.

FIG. 8 illustrates a flow chart of changing a display range in consideration of touch information in an electronic device according to certain embodiments of the present disclosure.

Referring to FIG. 8, in step 801, the electronic device checks whether a first touch is detected. For example, when a touch on first point 901 is maintained for a predetermined time as illustrated in FIG. 9A, the electronic device recognizes that a screen control event is activated.

When the screen control event is activated by the first touch, in step 803, the electronic device checks whether a second touch is detected.

When the second touch is detected, in step 805, the electronic device determines a display range change region in consideration of a first touch point and a second touch point. For example, when a touch on second point 903 is detected as illustrated in FIG. 9B, the electronic device determines first display range change region 907, second display range change region 909 and first reference region 905 in consideration of first point 901 and second point 903.

After determining the display range change regions in consideration of the first touch point and the second touch point, in step 807, the electronic device checks whether change in a distance between the first touch point and the second touch point is detected. For example, the electronic device checks whether a touch detected on second point 903 moves to third point 911 as illustrated in FIG. 9C. In another example, the electronic device checks whether a touch moves from third point 911 to second point 903 as illustrated in FIG. 9D.

When change in a distance between the first touch point and the second touch point is detected, in step 809, the electronic device changes the display range of the display range change region in consideration of the change in the distance between the first touch point and the second touch point. For example, when a drag from second point 903 to third point 911 is detected as illustrated in FIG. 9C, the electronic device expands second display range change region 909 in consideration of the drag distance from second point 903 to third point 911, and displays first outer region 915 which had not been displayed on the screen. In this case, the electronic device reduces the size of the contents of first reference region 905 to fit second reference region 913 and displays the same as illustrated in FIG. 9C.

If, in a state in which second display range change region 909 has been expanded as illustrated in FIG. 9C, a drag from third point 911 to second point 903 is detected as illustrated in FIG. 9D, the electronic device may display second display range change region 909 in consideration of the drag distance from third point 911 to second point 903. In this case, the electronic device may expand the size of the contents of second reference region 913 to fit first reference region 905 and display the same as illustrated in FIG. 9D.

Thereafter, the electronic device ends the algorithm.

In certain embodiments, when the display range of a display range change region is changed according to a first drag, the electronic device may restore the display range change region to an original condition according to a second drag.

In certain embodiments, the electronic device may restore the display range change region to an original condition through a display range change region-restoration event. In this case, the display range change region-restoration event may be generated by one or more of a touch gesture, a menu selection, and a button input.

Figure 10:
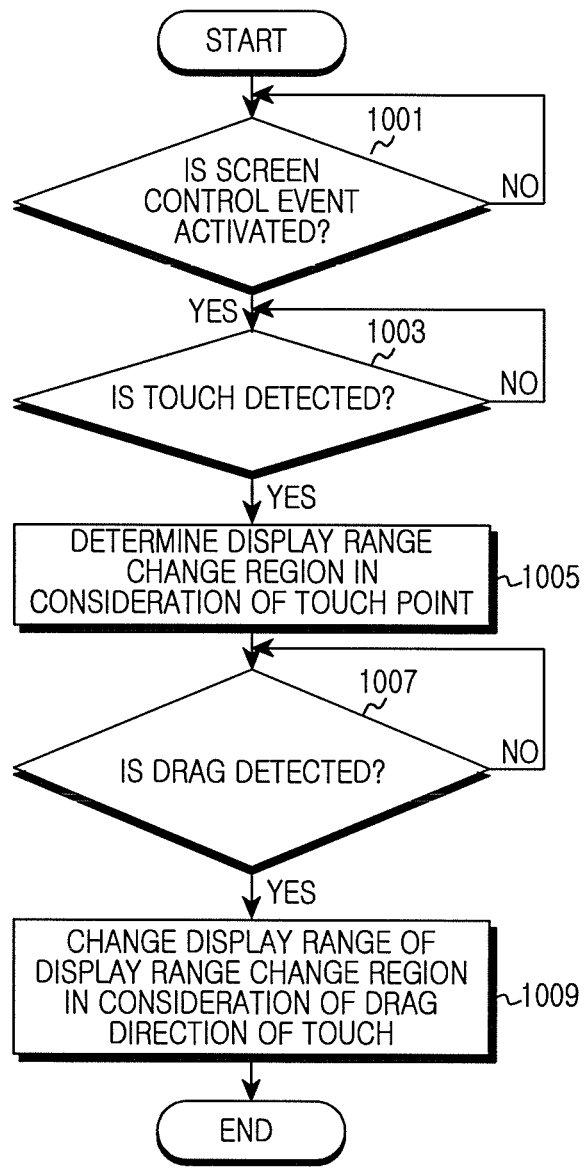
FIG. 10 illustrates a flow chart of changing a display range depending on whether a screen control event is activated in an electronic device according to embodiments of the present disclosure.

FIG. 10 illustrates a flow chart of changing a display range depending on whether a screen control event is activated in an electronic device according to certain embodiments of the present disclosure.

Referring to FIG. 10, in step 1001, the electronic device checks whether a screen control event is activated. For example, the electronic device checks whether the screen control event is activated by a user's menu manipulation. For example, when a touch on first point 1001 is maintained for a predetermined time as illustrated in FIG. 10A, the electronic device recognizes that the screen control event is activated.

In a case of activating the screen control event, in step 1003, the electronic device checks whether a touch is detected.

When the touch is detected, in step 1005, the electronic device determines a display range change region in consideration of a touch point. For example, when the touch on first point 1101 is detected, as illustrated in FIG. 11A, the electronic device determines first display range change region 1103 and second display range change region 1105 based on first point 1101.

After determining the display range change region in consideration of the touch point, in step 1007, the electronic device checks whether a drag is detected. For example, the electronic device checks whether the touch detected on first point 1101 moves to second point 1107 as illustrated in FIG. 11B. In another example, the electronic device may check whether a touch detected on second point 1107 moves to first point 1101 as illustrated in FIG. 11C.

When a drag is detected, in step 1009, the electronic device expands the display range of a display range change region located in a direction opposite to the direction of the drag. For example, when a drag from first point 1101 to second point 1107 is detected as illustrated in FIG. 11B, the electronic device expands second display range change region 1105 in consideration of the drag distance from first point 1101 to second point 1107, and displays first outer region 1111 which had not been displayed on the screen. In this case, the electronic device displays first display range change region 1109 to be overlapped by second display range change region 1105 and first outer region 1111 in consideration of the drag distance from first point 1101 to second point 1107.

If, in a state in which second display range change region 1105 has been expanded as illustrated in FIG. 11B, a drag from second point 1107 to first point 1101 is detected as illustrated in FIG. 11C, the electronic device may display second display range change region 1105 in consideration of the drag distance from second point 1107 to first point 1101. In this case, the electronic device may display first display range change region 1109 in consideration of the drag distance from second point 1107 to first point 1101.

Thereafter, the electronic device ends the algorithm.

In certain embodiments, when the display range of the display range change region is changed according to a first drag, the electronic device may restore the display range change region to an original condition according to a second drag.

In certain embodiments, the electronic device may restore the display range change region to an original condition through a display range change region-restoration event. In this case, the display range change region-restoration event may be generated by one or more of a touch gesture, a menu selection, and a button input.

Figure 12:
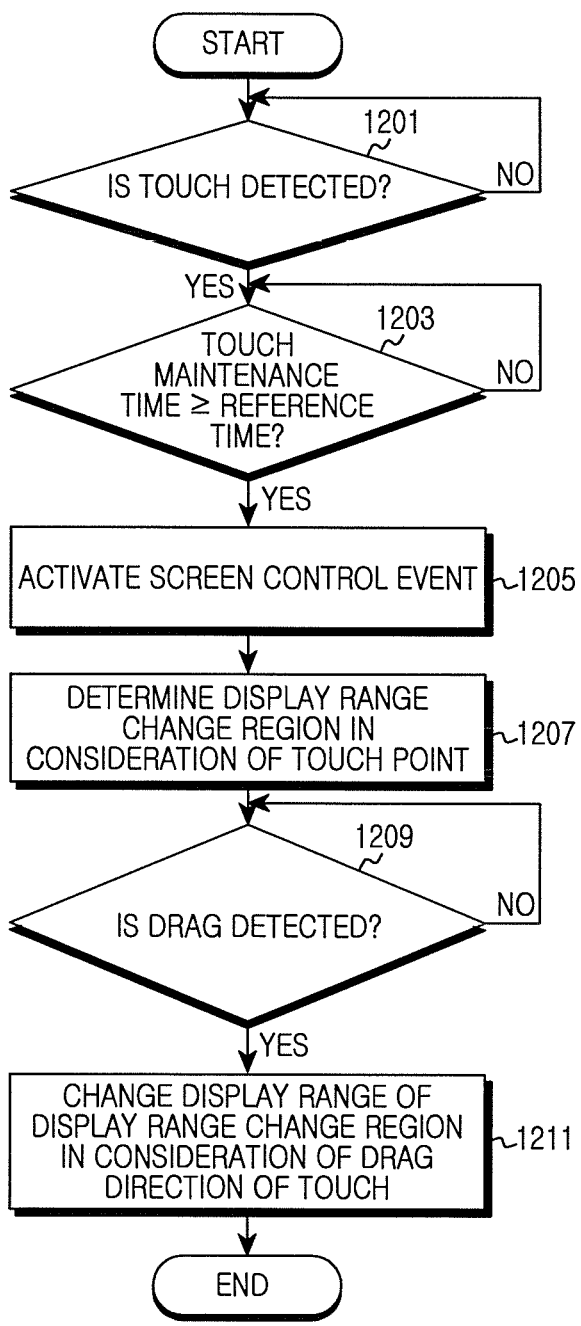
FIG. 12 illustrates a flow chart of changing a display range depending on whether a screen control event is activated in an electronic device according embodiments of the present disclosure.

FIG. 12 illustrates a flow chart of changing a display range depending on whether a screen control event is activated in an electronic device according to certain embodiments of the present disclosure.

Referring to FIG. 12, in step 1201, the electronic device checks that a touch is detected.

Figure 13A:
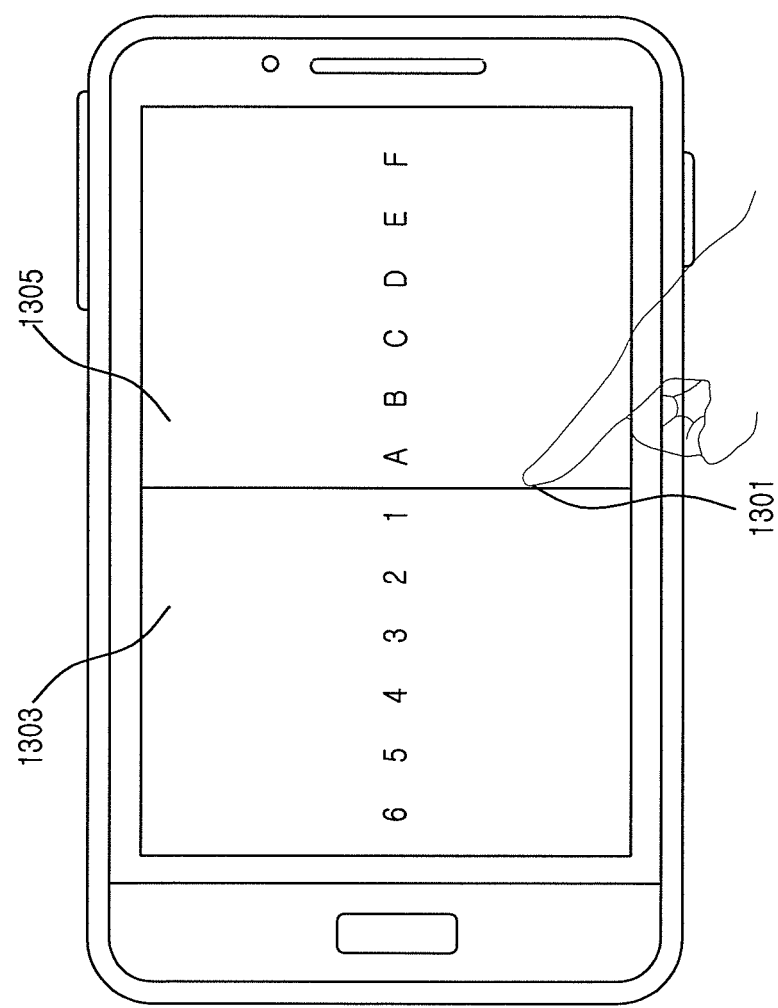
FIGS. 13A to 13E illustrate screen configurations for changing a display range depending on whether a screen control event is activated in an electronic device according to embodiments of the present disclosure.

When the touch is detected, in step 1203, the electronic device compares a touch maintenance time with a reference time in order to check whether a screen control event is generated. For example, the electronic device checks whether the touch detected on first point 1301 has been maintained for the reference time or more as illustrated in FIG. 13A.

When the touch maintenance time is longer than the reference time, in step 1205, the electronic device activates the screen control event.

After activating the screen control event, in step 1207, the electronic device determines a display range change region in consideration of a touch point. For example, as illustrated in FIG. 13A, the electronic device determines first display range change region 1303 and second display range change region 1305 based on first point 1301.

Figure 13B:
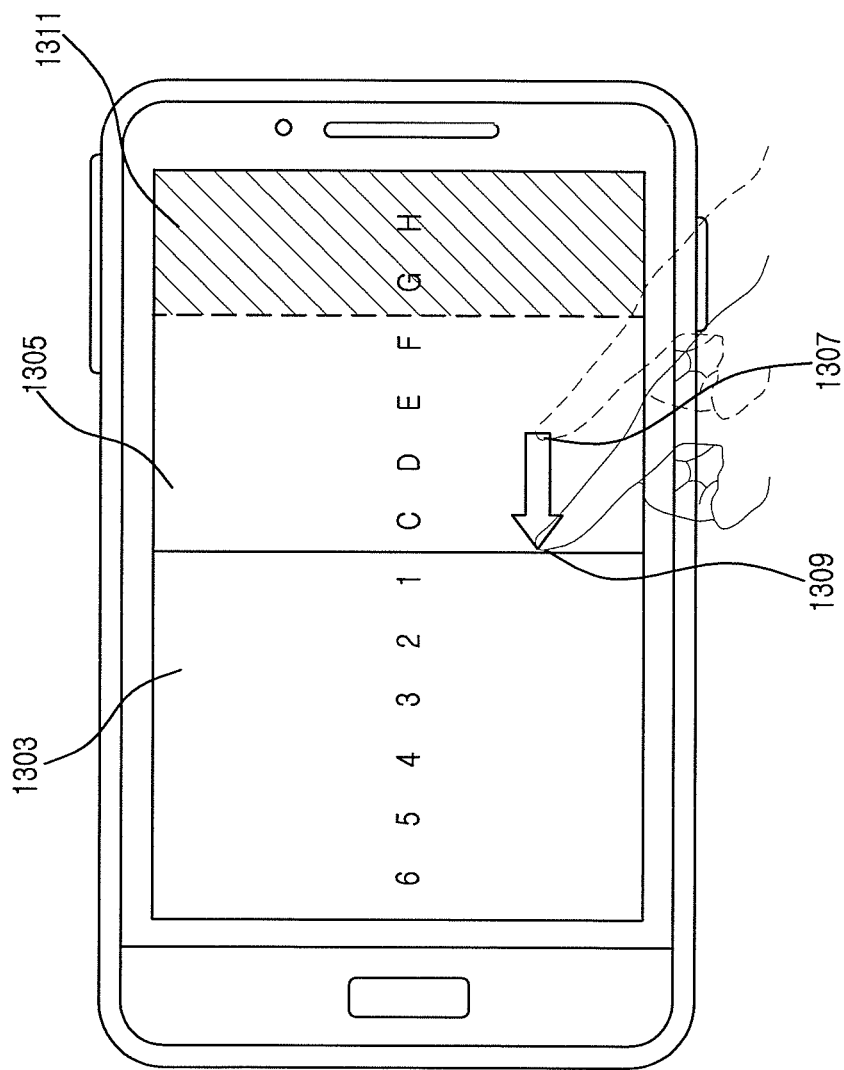

After determining the display range change region in consideration of the touch point, in step 1219, the electronic device checks whether a drag is detected. For example, the electronic device checks whether a touch detected on second point 1307 moves to third point 1309 as illustrated in FIG. 13B. If the touch has moved from second point 1307 to third point 1309, as illustrated in FIG. 13B, the electronic device may check whether a touch detected on third point 1309 moves to second point 1307 as illustrated in FIG. 13D.

Figure 13C:
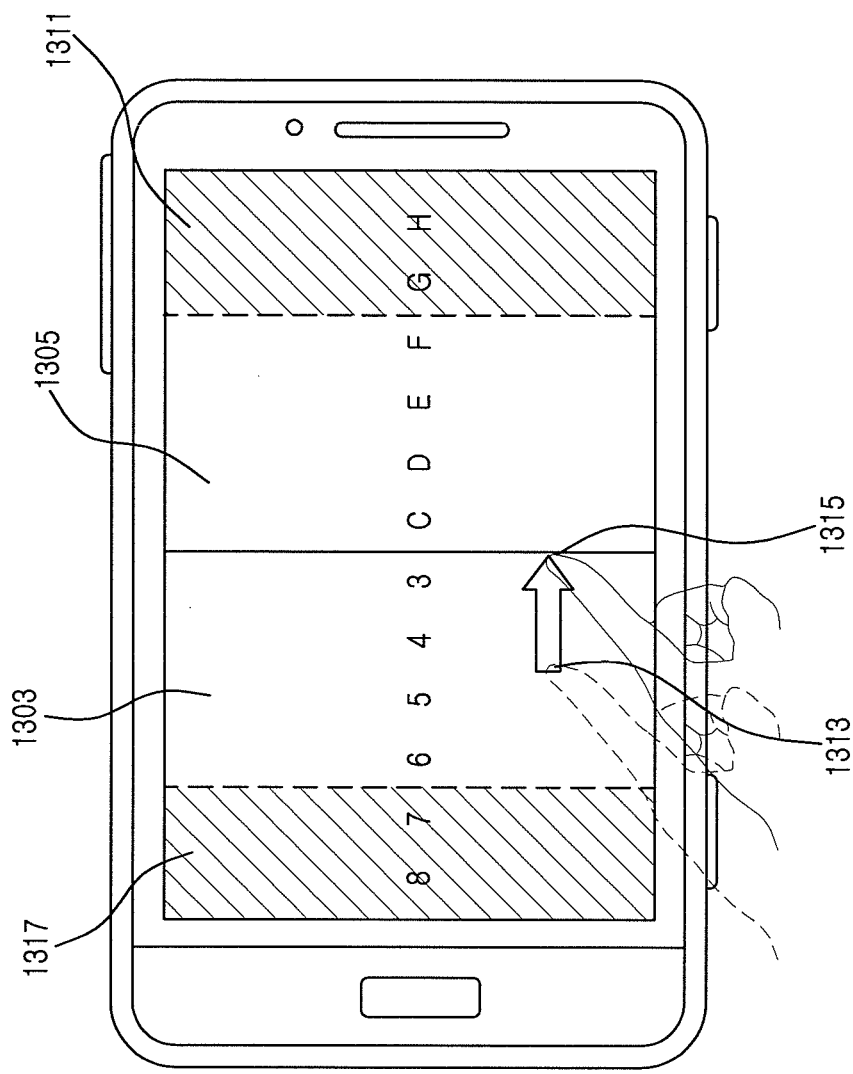

In another example, the electronic device may check whether a touch detected on fourth point 1313 moves to fifth point 1315 as illustrated in FIG. 13C. If the touch has moved from fourth point 1313 to fifth point 1315, the electronic device as illustrated in FIG. 13C, the electronic device may check whether a touch detected on fifth point 1315 moves to fourth point 1313 as illustrated in FIG. 13E.

When a drag is detected, in step 1211, the electronic device changes a display range of a display range change region located in a direction opposite to the direction of the drag. For example, when a drag from second point 1307 to third point 1309 is detected as illustrated in FIG. 13B, the electronic device displays second display range change region 1305 to be covered by first display range change region 1303 in consideration of the drag distance from second point 1307 to third point 1309. In this case, the electronic devices shifts first outer region 1311, which had not been displayed on the screen, toward first display range change region 1303 and displays the same.

Figure 13D:
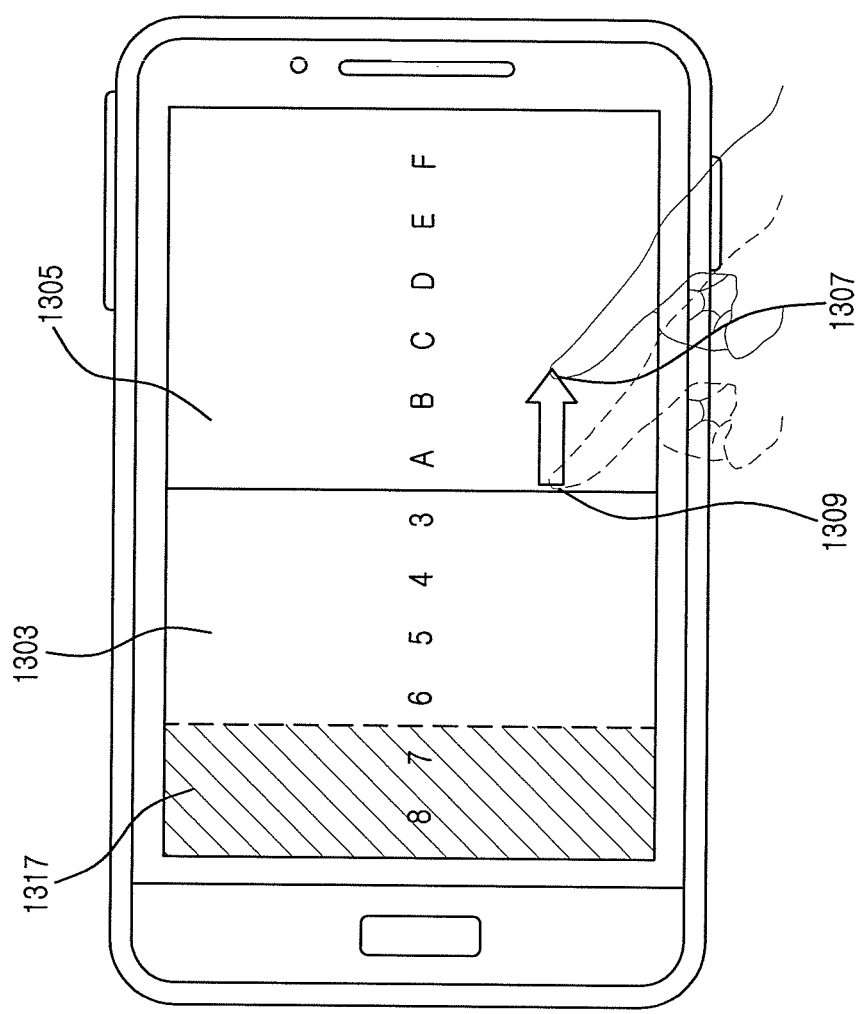
Figure 13E:
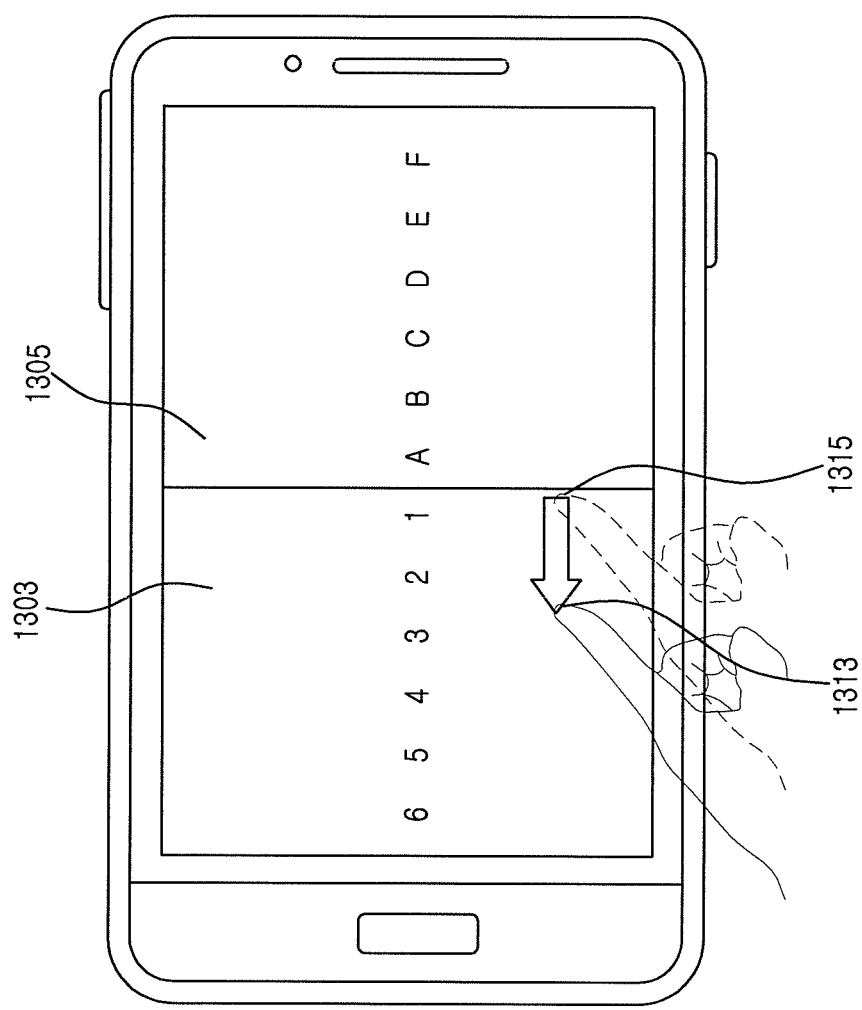

If, in a state in which the display ranges of second display range change region 1305 and first outer region 1311 have been changed as illustrated in FIG. 13B, a drag from third point 1309 to second point 1307 is detected as illustrated in FIG. 13D, the electronic device may shift second display range change region 1305 toward second point 1307 in consideration of the drag distance from third point 1309 to second point 1307, and display the same.

For example, when a drag from fourth point 1313 to fifth point 1315 is detected as illustrated in FIG. 13C, the electronic device displays first display range change region 1303 to be covered by second display range change region 1305 in consideration of the drag distance from fourth point 1313 to fifth point 1315. In this case, the electronic device shifts second outer region 1317, which had not been displayed on the screen, toward second display range change region 1305 and displays the same.

If, in a state in which the display ranges of first display range change region 1303 and second outer region 1317 have been changed as illustrated in FIG. 13C, a drag from fifth point 1315 to fourth point 1313 is detected as illustrated in FIG. 13E, the electronic device may shift first display range change region 1303 toward second point 1307 in consideration of the drag distance from fifth point 1315 to fourth point 1313, and display the same.

Thereafter, the electronic device ends the algorithm.

In certain embodiments, when the display range of the display range change region is changed according to a first drag, the electronic device may restore the display range change region to an original condition according to a second drag.

In certain embodiments, the electronic device may restore the display range change region to an original condition through a display range change region-restoration event. In this case, the display range change region-restoration event may be generated by one or more of a touch gesture, a menu selection, and a button input.

In certain embodiments, the electronic device determines a display range change region in consideration of a touch point or a plurality of touch points.

In certain embodiments, the electronic device may determine a display range change region in horizontal, vertical and diagonal directions in consideration of an one or more angles defined by a plurality of touch points based on the plurality of touch points.

Figure 14A:
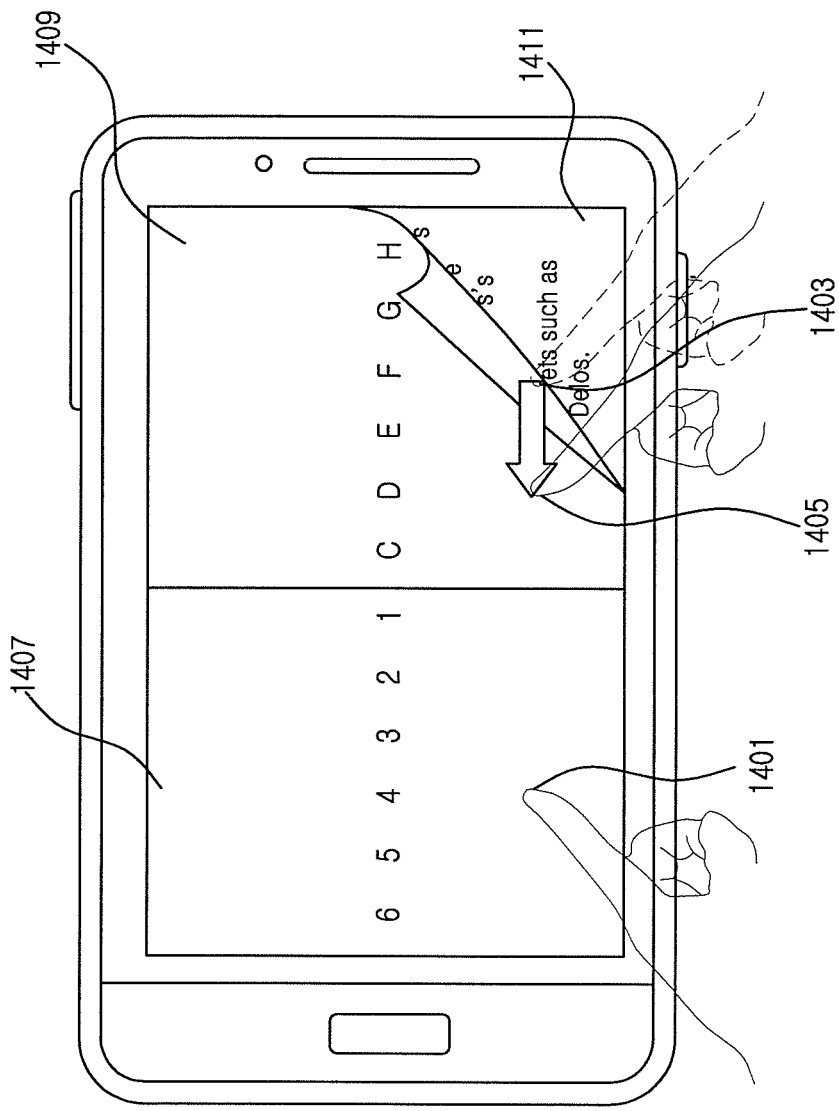
FIGS. 14A to 14B illustrate screen configurations for performing page turning in an electronic book in consideration of touch information according to embodiments of the present disclosure.
Figure 14B:
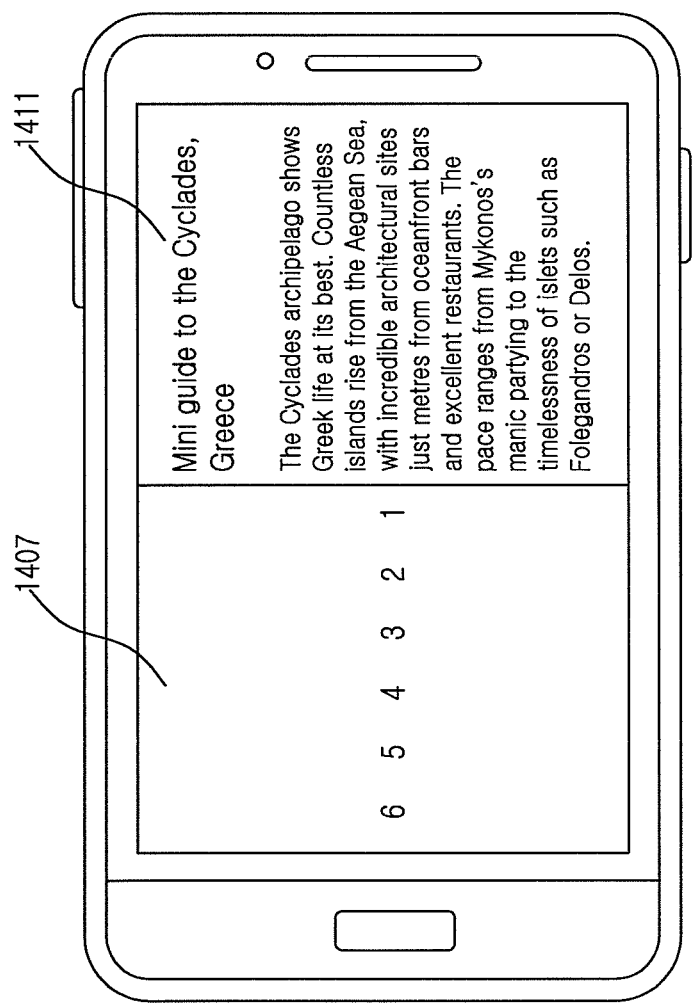

In addition, the electronic device may perform page turning in an electronic book in consideration of touch information. For example, when a drag from second point 1403 to third point 1405 is detected with a touch on first point 1401 maintained as illustrated in FIG. 14A, the electronic device does not perform page turning on first region 1407 corresponding to first point 1401, and performs page turning from second region 1409 on which the drag has been detected, to third region 1411, as illustrated in FIG. 14B.

As described above, since the electronic device having a touchscreen changes a display range on a region desired by a user in consideration of touch information, there is an advantage in which the user of the electronic device can easily compare displayed data existing on different regions.

Embodiments of the present disclosure according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

While the present disclosure has been shown and described with reference to certain embodiments, it will be understood by those skilled in the art that various changes in form and details may be made therein without departing from the spirit and scope of the disclosure as defined by the appended claims. The scope of the invention is defined not by the detailed description but by the appended claims, and all differences within the scope will be construed as being included in the present disclosure.

What is claimed is:

1. A method of an electronic device, the method comprising:
   detecting a touch on a first point of a touch screen;
   determining a first region and a second region on the touch screen based on the first point, wherein the touch screen is divided into the first region and the second region by a reference line extended from the first point;
   detecting that the touch moves from the first point to a second point in the first region;
   expanding the second region on the touch screen by moving the reference line onto the second point; and
   displaying an outer region which had not been displayed on the touch screen to the expanded second region.

2. The method of claim 1, wherein the expanding of the second region comprises:
   overlaying the second region on the first region.

3. The method of claim 1, wherein the determining of the first region and the second region on the touch screen comprises:
   detecting that the touch is maintained on the first point for a predetermined time; and
   determining the first region and the second region on the touch screen based on the first point.

4. The method of claim 1, wherein the expanding of the second region comprises:
   expanding the second region by a distance between the first point and the second point on the touch screen.

5. The method of claim 4, wherein a range of the outer region is determined corresponding to the distance.

6. The method of claim 1, wherein the expanding of the second region comprises:
   expanding the second region according to a direction from the first point to the second point.

7. The method of claim 1, further comprising:
   detecting that the touch moves from the second point to a third point in the second region; and
   reducing the second region on the touch screen by moving the reference line onto the third point.

8. An electronic device comprising:
   a touch screen;
   a processor;
   a memory; and
   an executable program stored in the memory that, when executed by the processor, causes the processor to:
   detect a touch on a first point of the touch screen;
   determine a first region and a second region on the touch screen based on the first point, wherein the touch screen is divided into the first region and the second region by a reference line extended from the first point;
   detect that the touch moves to a second point in the first region;
   expand the second region on the touch screen by moving the reference line onto the second point; and
   display an outer region which had not been displayed on the touch screen to the expanded second region.

9. The electronic device of claim 8, wherein the executable program causes the processor to expand the second region by:
   overlaying the second region on the first region.

10. The electronic device of claim 8, wherein the executable program causes the processor to determine the first region and the second region on the touch screen by:
    detecting that the touch is maintained on the first point for a predetermined time, and
    determining the first region and the second region on the touch screen based on the first point.

11. The electronic device of claim 8, wherein the executable program causes the processor to expand the second region by:
   expanding the second region by a distance between the first point and the second point on the touch screen.

12. The electronic device of claim 11, wherein a range of the outer region is determined corresponding to the distance.

13. The electronic device of claim 8, wherein the executable program causes the processor to expand the second region by:
   expanding the second region according to a direction from the first point to the second point.

14. The electronic device of claim 8, wherein the executable program causes the processor to:
   detect that the touch moves from the second point to a third point in the second region, and
   reduce the second region on the touch screen by moving the reference line onto the third point.

* * * * *